United States Patent [19]

Ebert et al.

[11] Patent Number: 4,646,255

[45] Date of Patent: Feb. 24, 1987

[54] GYRO SIMULATOR

[75] Inventors: Philip C. Ebert, Lynnwood; Lawrence E. Holliday, Seattle, both of Wash.

[73] Assignee: The Boeing Company, Seattle, Wash.

[21] Appl. No.: 490,655

[22] Filed: May 2, 1983

[51] Int. Cl.[4] .............................................. G06F 15/06
[52] U.S. Cl. ...................................... 364/578; 364/424
[58] Field of Search ............... 364/578, 424, 443, 457, 364/453; 74/5 R; 244/79

[56] References Cited

U.S. PATENT DOCUMENTS

| 2,554,155 | 5/1951 | Rippere. | |
|---|---|---|---|
| 2,704,644 | 3/1955 | Good et al.. | |
| 2,793,445 | 5/1957 | Wakefield et al.. | |
| 2,964,857 | 12/1960 | Hunt. | |
| 2,965,976 | 12/1960 | Schwarm. | |
| 3,026,630 | 3/1962 | White, Jr. et al.. | |
| 3,064,471 | 11/1962 | Pierce. | |
| 3,114,788 | 12/1963 | Hemstreet. | |
| 3,238,441 | 3/1966 | Gucker. | |
| 3,261,970 | 7/1966 | Snyder. | |
| 3,266,052 | 8/1966 | Yamron. | |
| 3,885,325 | 5/1975 | Sidoti. | |
| 3,911,255 | 10/1975 | Dewar et al.. | |
| 4,060,718 | 11/1977 | Huddle | 364/453 X |
| 4,141,065 | 2/1979 | Sumi et al.. | |
| 4,149,260 | 4/1979 | Loper, Jr.. | |
| 4,208,719 | 6/1980 | Lotz et al. | 364/578 X |
| 4,215,420 | 7/1980 | Kassakian. | |
| 4,311,466 | 1/1982 | Carpenter et al. | 364/578 X |
| 4,343,035 | 8/1982 | Tanner | 364/453 |
| 4,400,789 | 8/1983 | Carpenter et al. | 364/578 |

OTHER PUBLICATIONS

Stable-Member Mounted Instrument Environment Simulation Model Development, Barnes, IEEE Transaction On Aerospace and Electronic Systems, vol. AES-8, No. 6. Nov. 1972, pp. 780-790.

R. C. Lee and F. B. Cox, "A High-Speed Analog-Digital Computer for Simulation", IRE Transactions on Electronic Computers, Jun. 1959, pp. 186-196.

L. T. Prince, "Simulation Cuts Flight Tests of New Autopilot", Control Engineering, Sep. 1959, pp. 194-195.

Primary Examiner—Edward J. Wise
Attorney, Agent, or Firm—James P. Hamley; B. A. Donahue

[57] ABSTRACT

An aircraft gyro simulator is operable in a dynamic mode to produce simulated pitch, roll and azimuth signals as a function of control wheel commands, flight control system commands, control surface status and the stored equations of flight for the aircraft under test. In its manual mode, the simulator responds to manual control commands to individually vary pitch, roll or azimuth, thereby testing aircraft systems response. In addition, multiple channels of tracking gyro signals may be produced, with each channel having a manually controlled offset of one or more gyro signals to test aircraft employing multiple autopilot systems.

21 Claims, 26 Drawing Figures

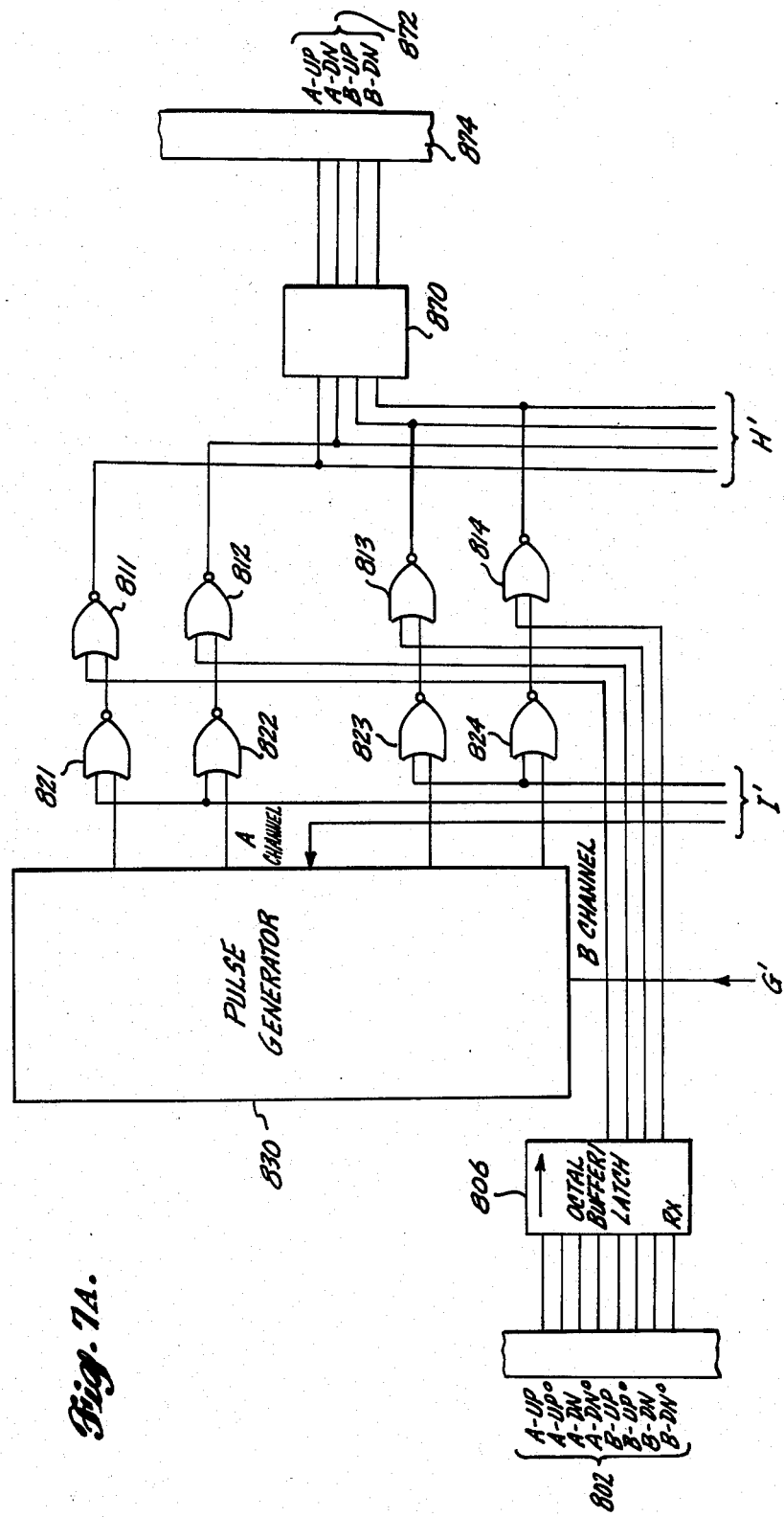

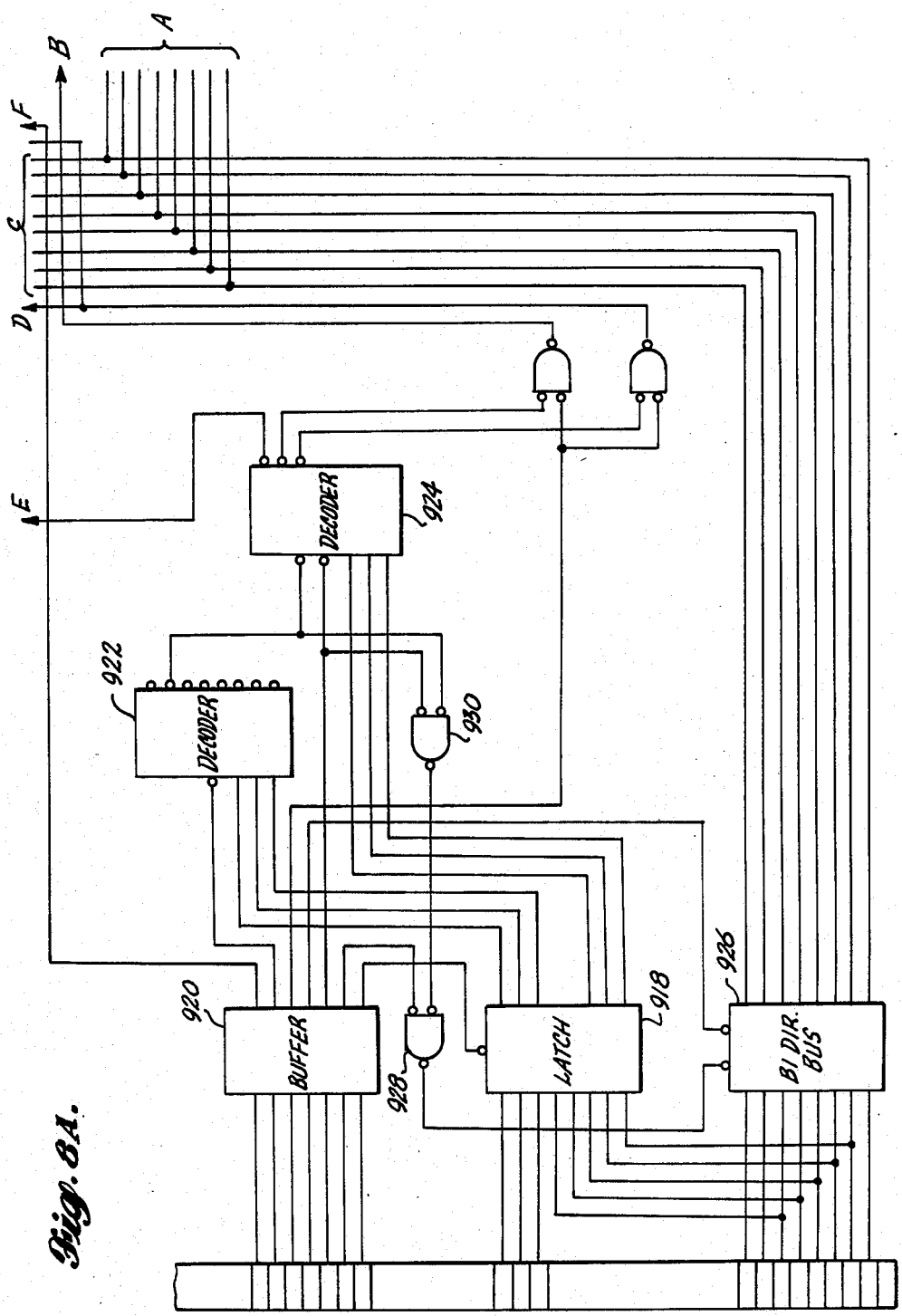

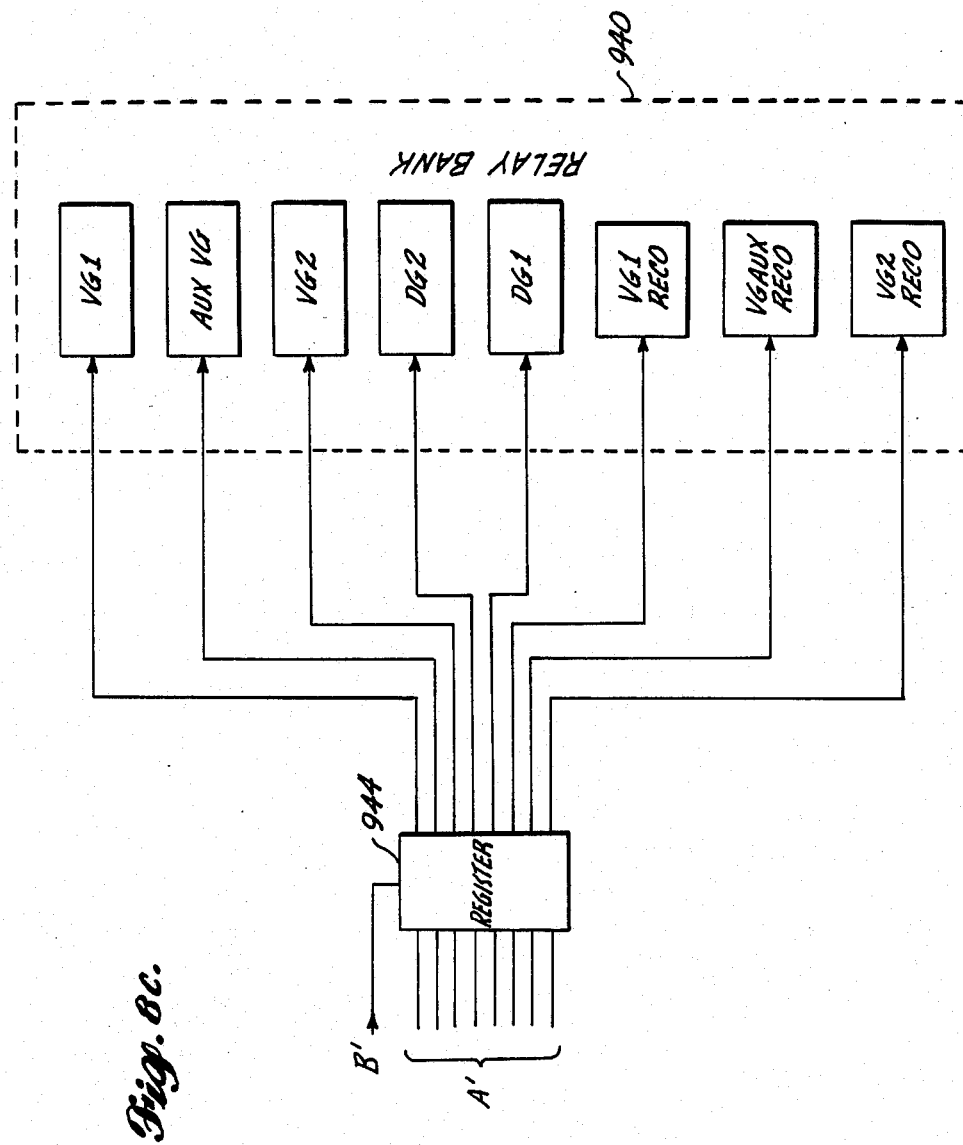

GYRO SIMULATOR

BACKGROUND OF THE INVENTION

The present invention pertains to the electrical signal simulation art and, more particularly, to apparatus for simulating the pitch, roll and azimuth signals produced by an aircraft's gyro system.

Commerical aircraft are commonly provided with multiple gyro systems. Each gyro system produces output signals corresponding to the pitch, roll and azimuth of the aircraft. These signals activate indicators within the flight deck thereby providing a visual display of pitch, roll and azimuth parameters, as well as being coupled to aircraft flight control systems, such as the autopilot. Often, redundant autopilots are employed, with each autopilot receiving input signals from redundant gyro systems. A comparator within the system monitors each gyro channel signal set, as well as the performance from each autopilot, and, in a predetermined manner, selects the appropriate one of the autopilot systems to control the aircraft.

The testing of aircraft systems which depend upon input gyro signals has been a cumbersome and expensive task. The most common approach is to remove the gyros from their aircraft mounting positions, and fasten the gyros to controlled tilt tables. By appropriate control of the tilt tables, the desired gyro test signals may be produced. Such gyro handling has often resulted in internal bearing damage to the gyro units, requiring their repair or replacement. In addition to the cost involved in repairing or replacing the gyros, there is the additional cost in man hours resulting from the time required to physically remove and then replace the gyros, as well as delays occasioned by gyro "spin up" and "spin down" times prior to handling.

Previous attempts at generating, or simulating, gyro signals have not proved successful. None of these prior attempts, for example, provided for dynamic testing of gyro responsive systems. That is, none accomplished a closed-loop test wherein commands from the control wheel and the autopilot directly deflected aircraft surfaces to simulate actual flight conditions. In addition, with systems employing multiple autopilots, no prior gyro simulation technique provided a means for offsetting the gyro signals supplied to redundant autopilots to thereby test autopilot comparator response.

SUMMARY OF THE INVENTION

It is an object of this invention, therefore, to provide apparatus for the simulation of gyro produced signals.

It is a further object of the invention to provide the above apparatus which employs means to dynamically test gyro responsive systems.

It is an additional object of the invention to provide the above-described apparatus which includes means for testing redundant autopilot systems.

Briefly, according to the invention, a gyro simulator for use in testing an aircraft having control surfaces deployable in response to manual control column and automatic flight control system commands, simulates pitch, roll and azimuth signals normally produced by the aircraft's onboard gyro system. The simulator comprises command input means which is selectively operable in a manual or in a dynamic mode. In the manual mode, the command input means produces command signals corresponding to a manually controlled change of a selected one of the simulated pitch, roll and azimuth signals. In the dynamic mode, the command input means is operable to permit controlled changes in the simulated pitch, roll and azimuth signals as a function of aircraft control column and flight control system commands. A command responsive means includes an input means for inputting signals representative of the status of the aircraft's control surfaces, commands from the aircraft's control column, commands from the aircraft's flight control system, a command airspeed value, and the command input means produced command signals. Memory means within the command responsive means stores the equations of flight of the aircraft under test. Logic means within the command responsive means responds to the input means and memory means for producing simulated pitch, roll and azimuth signals.

Where an aircraft having a flight control system capable of receiving and processing signals from first and second gyro channels is to be tested, the command input means includes means for producing first command signals for commanding a change in one of the simulated pitch, roll and azimuth signals of a first gyro channel and a means for producing second command signals for commanding a change in one of the simulated pitch, roll and azimuth signals of a second gyro channel. The command responsive means further includes first logic means responsive to the input means, memory means and command input means produced first command signals for producing the first gyro channel simulated pitch, roll and azimuth signals and second logic means responsive to said input means, memory means and command input means produced second command signals for producing the second gyro channel simulated pitch, roll and azimuth signals.

BRIEF DESCRIPTION OF THE DRAWINGS

FIGS. 7A–7C are detailed schematic diagrams of the touch and direction sensitive switch interface;

FIGS. 8A–8C are detailed schematic diagrams of the electronics module relay circuit;

DETAILED DESCRIPTION OF THE PREFERRED EMBODIMENT OF THE INVENTION

Figure 1:
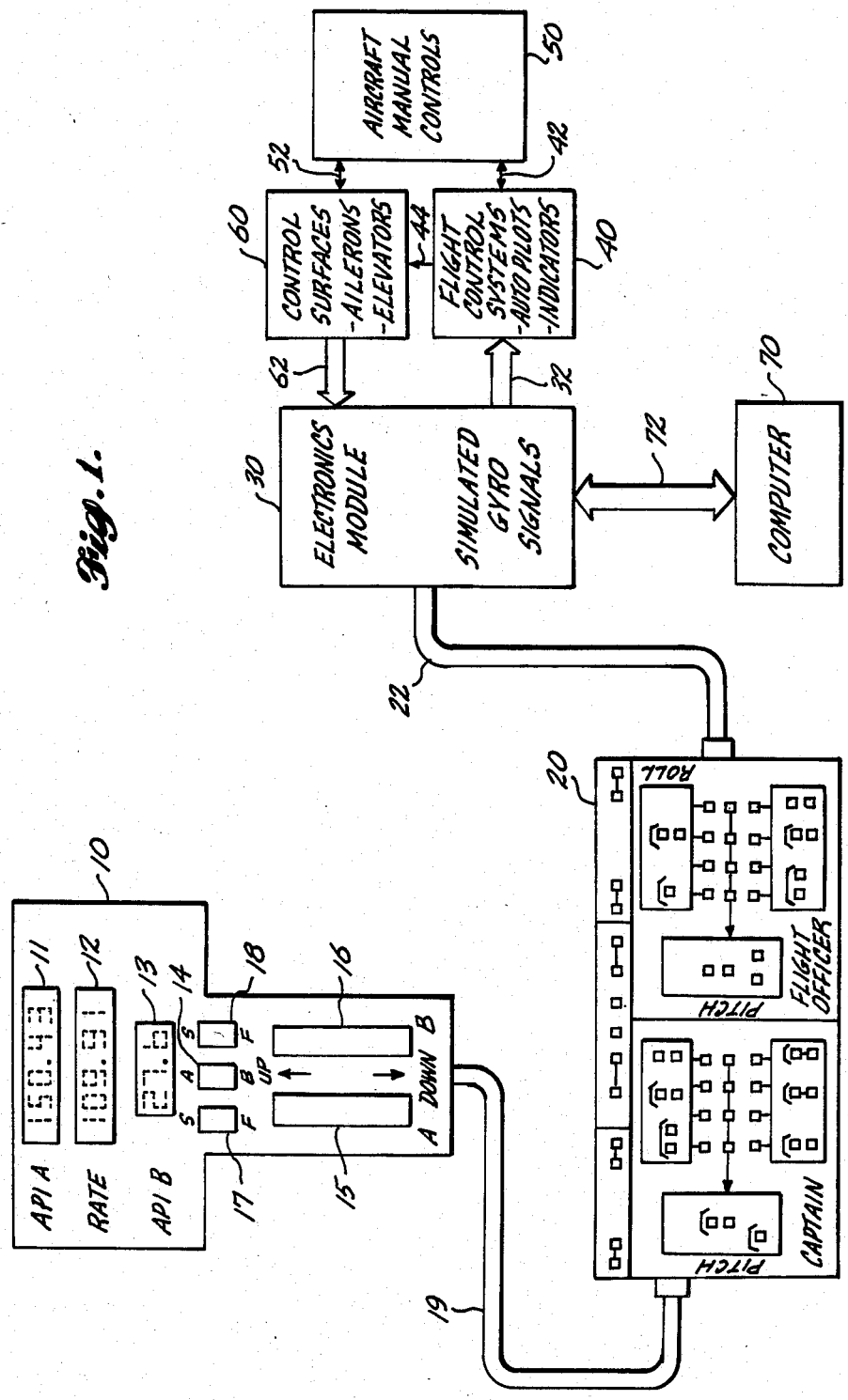
FIG. 1 is a block diagram illustrating the principal components of the gyro simulator and their interface with the aircraft under test.

FIG. 1 illustrates the principal assemblies of the gyro simulator, including a hand-held unit 10, a control unit 20 and an electronics module 30.

Hand-held unit 10 is provided with three readouts 11, 12 and 13. Readouts 11 and 12 represent angle position indicators and are selectable, via the control unit 20, to display the measured instantaneous value of pitch, roll or azimuth of either of two gyro simulated channels. Display 13 is selectable, via switch 14, to readout the rate of change, in degrees per second, of either the selected A or B gyro signals.

In the manual mode of operation, selected by control unit 20, a user may manually force a change in the signal displayed by displays 11, 12, or in any other desired output channel. This is accomplished via a pair of touch and direction sensitive signal generators 15, 16. The operator, using his finger or other suitable object, may stroke either of the signal generator sensors 15, 16 in the indicated up or down direction to thereby produce a corresponding change in the gyro simulated signals as displayed in displays 11, 12, respectively. The signals produced by the generators 15, 16 are such that the faster the sensor pad is stroked, the greater the rate of change of the desired synchro signal. In addition, switches 17, 18 are settable in either a slow or a fast position to control the rate of change as produced by the signal generators 15, 16, respectively.

Hand-held unit 10 is connected to the control unit 20 via a multiconductor cable 19. The mode of operation of the gyro simulator is determined by the settings of a plurality of switches provided on the control unit 20. The switches and their corresponding function are described in detail with respect to FIG. 2. Basically, all manually input control signals to the gyro simulator are processed through control unit 20, applied via a cable 22, to the electronics module 30, which, then, in response to the command signals, produces the appropriate gyro signals. Switching from the control unit 20 determines which gyro signals are to be displayed on readouts 11, 12 of hand-held unit 10 and which two gyro signals may be manually controlled via the generators 15, 16. In addition, control unit 20 provides a means for a user selectable true airspeed signal level, via the indicators 11, 12 and manually controlled generators 15, 16. Also, for aircraft employing multiple autopilots, control unit 20 is capable of producing command signals which, through electronics module 30, result in multiple gyro channels. These channels may be made to track one another precisely or, via control supplied by control unit 20, a manual offset, via hand-held unit 10, may be applied to one or more of the gyro signals in a redundant channel.

The electronics module 30 receives command input signals via line 22 from control unit 20 and also interfaces with the aircraft gyro control responsive systems. Thus, the simulated gyro signals produced by the electronics module 30 are coupled via a line 32 to the aircraft's flight control systems 40. These systems include one or more autopilots and the indicating systems. These indicating systems would normally include flight deck panel instruments such as the attitude director indicator, horizontal situation indicator, and the like.

An additional input to the flight control systems 40 is provided over a line 42 from the aircraft's manual controls 50. The principal aircraft manual control is, normally, the control column.

Command signals produced by the aircraft's manual controls 50 are passed over a line 52 to the aircraft's control surfaces 60. Also passed to the control surfaces 60 are command signals as produced by the flight control systems over a line 44. The aircraft's control surfaces, normally ailerons and elevators, are deployed in response to these command input signals. The positions of the control surfaces are sensed by suitable sensors and passed, via line 62, to the electronics module 30.

The gyro simulator is capable of operating in any one of three modes. In its manual mode, the electronics module 30 receives command inputs from control unit 20 corresponding to the gyro signal, or signals, to be controlled. Electronics module 30 processes the command inputs, and produces the appropriate pitch, roll and azimuth outputs. The resultant simulated gyro signals are then coupled to the aircraft's flight control systems 40 to monitor response of the flight control systems to the commanded gyro signals.

In the dynamic mode, command signals from the aircraft's manual controls 50 and flight control systems 40 deploy the aircraft's control surfaces 60, which, as sensed by the electronics module 30, in turn produces its corresponding gyro simulated signals. The simulated gyro signals are produced in real time in accordance with the laws of motion and the aerodynamic characteristics of the aircraft under test. Thus, in the dynamic mode, the system is operated closed-loop in a manner which simulates actual flight conditions. Inasmuch as the aircraft's actual control surfaces as "in-the-loop," a comprehensive test of the aircraft is accomplished.

Aircraft employing multiple autopilot systems, each responding to an independent gyro channel, may be tested by the gyro simulator. The electronics module 30 is capable of producing multiple gyro channel outputs, under the control of the control unit 20. The pitch, roll and azimuth of each channel may be made to exactly track each other, or track each other with a manually input offset via the hand-held unit 10. By providing the offset feature, the gyro simulator may test the comparator normally employed in aircraft having multiple autopilots, the function of which is to select that autopilot produced control signal set which is producing proper control signals.

Finally, the gyro simulator is operable in a remote mode wherein control signals produced by a computer 70 are fed directly, via a bus 72, to the electronics module 30. All signals and outputs in the manual and dynamic modes are available in the remote mode. The computer may be suitably programmed to produce a predetermined set of gyro test signals useful for checking out the aircraft's gyro responsive systems.

Figure 2:
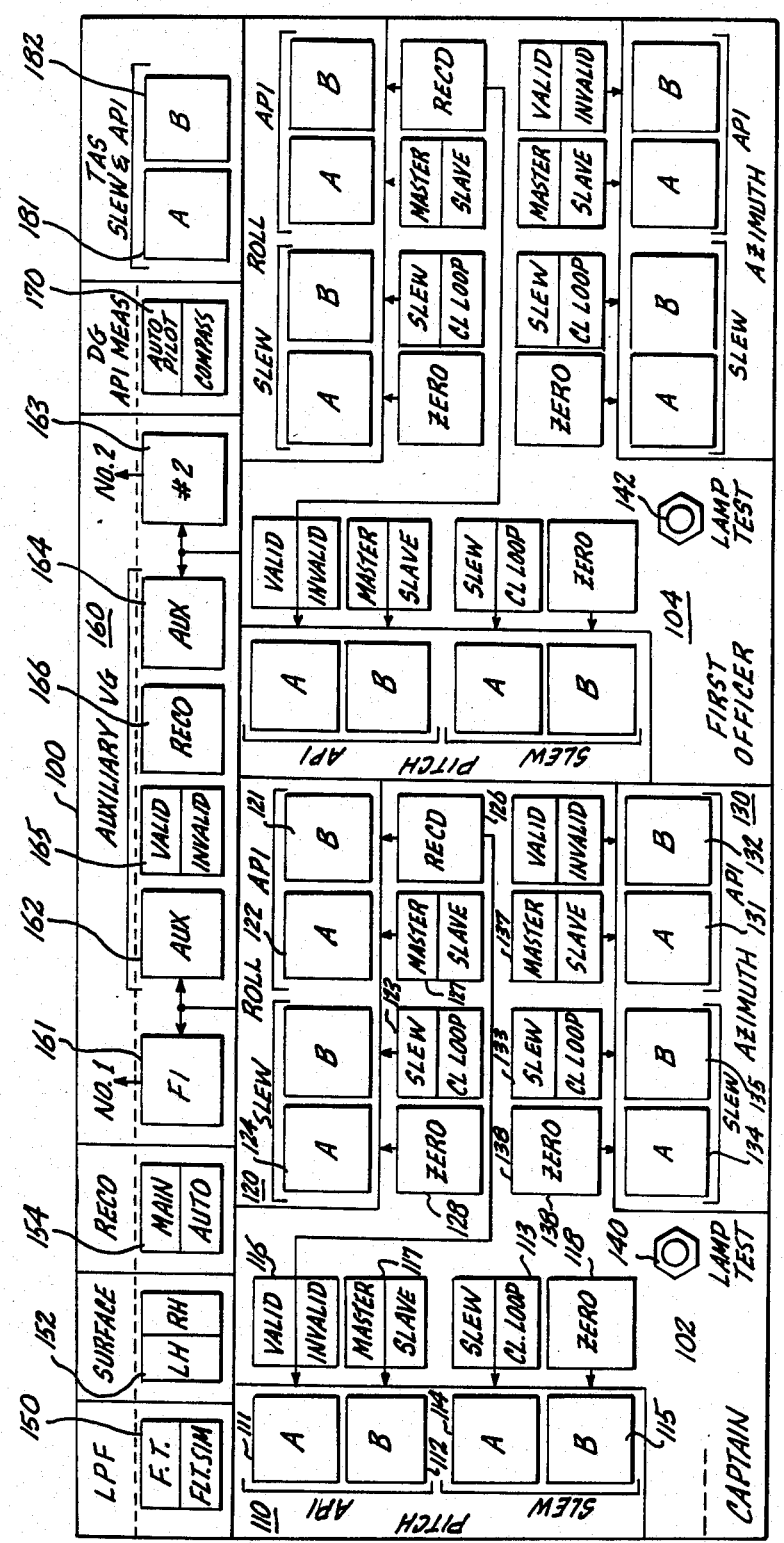
FIG. 2 is a face view of the control panel of the gyro simulator illustrating the various user selectable modes of operation.

FIG. 2 illustrates the layout of the control panel 100 of the control unit 20 shown in FIG. 1. The major portion of the panel is split into redundant controls 102, 104, designated "captain" and "first officer," respectively. Inasmuch as the controls 102, 104 are redundant, only the captain's controls are discussed in detail herein.

The captain's controls are divided into a pitch grouping 110, a roll grouping 120 and an azimuth grouping 130. Starting with the pitch grouping 110, depression of one of two pushbuttons 111, 112 causes the instantaneous value of pitch to be displayed upon either the channel A angle position indicator or the channel B angle position indicator of the hand-held unit (i.e., indicators 11 or 12, respectively, of FIG. 1). If the operator wishes to manually control the pitch signal, he actuates a pushbutton 113 to its "SLEW" position. This pushbutton is otherwise in its closed loop "CL LOOP" position, corresponding to the dynamic mode of operation with no manual input for pitch. The operator also depresses either the A pushbutton 114 or B pushbutton 115 corresponding to whether pitch is being read out on the A channel or B channel of the hand-held unit via switching 111, 112. If, for example, pushbuttons 111, 114, as well as push button 113, are depressed, the operator has manual control over pitch, as read out on the attitude position indicator of channel A, via the touch and direction responsive pulse generator designated A on the hand-held unit.

A switch 116 is actuable to either a "VALID" or an "INVALID" position. The VALID position allows manual inputs as described above, whereas in the INVALID position, a predetermined signal, corresponding to an out-of-specification pitch or roll signal, is supplied by the gyro simulator. This INVALID signal is used to test the aircraft's monitoring system, which has the function of monitoring and identifying the out-of-specification signals.

A pushbutton 117 is actuable to either a "MASTER" or a "SLAVE" mode. As is discussed in more detail hereafter, the gyro simulator is capable of producing a first gyro signal set, under the control of the captain's controls 102, and an independent second gyro set, under the control of the first officer's controls 104. The signals produced by one gyro channel may be caused to track the signals produced by the other channel via the use of the MASTER/SLAVE control. Thus, if the pitch signal in the channel controlled by the first officer's controls 104 is to follow the pitch signal produced by the captain's controls 102, MASTER/SLAVE switch 117 is activated to its "MASTER" position. Conversely, if the captain's pitch signal is to track the pitch signal in the first officer's channel, switch 117 is activated to the "SLAVE" position.

A "ZERO" pushbutton 118 may be activated if the operator wishes the pitch signal to automatically increment from its present value to a zero degree value.

As with pitch section 110, roll section 120 controls include pushbuttons 121, 122 which cause the instantaneous value of the roll signal to be read out on either the A channel or the B channel respectively, of the automatic position indicator. The operator may manually control the value of the roll signal, via activation of a switch 123, to its "SLEW" position and activation of either the A channel 124 or the B channel 125 pushbuttons.

Rather than a VALID/INVALID switch, such as switch 116 of the pitch section 110, the roll section 120 includes a "RECO" pushbutton 126. This pushbutton, when activated, produces a roll signal corresponding to the signal normally produced by the vertical gyro during roll erection cutoff. Roll erection cutoff is a limiting value of the gyro when roll of the aircraft exceeds a predetermined limit, such as six degrees. A roll erection cutoff signal is useful for testing the aircraft's autopilot system, which, when operating properly, should not engage during such steep roll angles, but, rather, should engage only when the roll angle is below an acceptable value.

A switch 127 allows the captain's roll signal to be either the MASTER of or a SLAVE to the first officer's roll signal.

A "ZERO" pushbutton 128, when activated, causes the instantaneous value of the roll signal to automatically increment to a zero degree value.

The azimuth section 130 of the captain's controls 102 corresponds exactly to the pitch section 110 controls. Thus, the automatic position indicators of either channel A or channel B may be caused to read out the instantaneous value of azimuth angle as selected by pushbutton 131 or pushbutton 132, respectively. The value of azimuth angle may be manually controlled by actuation of a pushbutton 133 to its "SLEW" position, with control of azimuth being either on the A channel control, as selected by pushbutton 134, or on the B channel control, via pushbutton 135. The azimuth produced signal of the captain's controls 102 may be the MASTER of, or the SLAVE to, the first officer's controls 104 as determined by a MASTER/SLAVE switch 137. The instantaneous value of azimuth may be automatically incremented from its present value to zero degrees by activation of pushbutton 138.

Finally, a pushbutton 140 in the captain's controls 102 activates all of the lamps associated with each of the pushbuttons in the captain's set. This accomplishes a comprehensive captain's lamp test. A similar lamp test pushbutton 142 is provided for testing the lamps associated with the pushbuttons in the first officer's controls 104.

A final set of pushbuttons is provided in an upper grouping on control panel 100. These include a pushbutton 150 designated "LPF" corresponding to low-pass filter. Pushbutton 150 is actuable to either a functional test "F.T." or a flight simulator "FLT.SIM." position. In its flight simulator position, pushbutton 150 introduces a low-pass filter into the system response, corresponding to time lags normally associated with the response of the aircraft. In the functional test mode, the lag filter is switched out, whereby the system responds instantaneously to the input commands.

For aircraft having redundant surface sensor outputs, such as redundant elevator sensors, a switch 152 allows either the left-hand (LH) or the right-hand (RH) surface sensor inputs to be applied to the gyro simulator.

A pushbutton 154 designated "RECO" corresponding to roll erection cutoff is actuable to a manual "MAN" or to an automatic "AUTO" position. In the MAN position, pushbutton 126 has manual control of RECO logic to the airplane. In the AUTO position, pushbutton 126 is inoperative. Also, in the AUTO position, the RECO logic is actuated when the measured roll angle is greater than 6°. The lamp within pushbutton 126 annunciates the RECO condition when pushbutton 154 is in either the MAN or the AUTO position.

A switch grouping 160 allows an auxiliary vertical gyro output to be controlled either via the captain's controls 102 or the first officer's controls 104. Pushbuttons 161, 162 are actuated if the captain's controls 102 are to control the auxiliary gyro output; whereas, pushbuttons 163, 164 are actuated if the first officer's controls 104 are to control the auxiliary vertical gyro output. In addition, a switch 165 may be actuated to produce an INVALID output on the auxiliary vertical gyro output and a switch 166 may be actuated to produce a roll erection cutoff output signal for the roll portion of the auxiliary vertical gyro signal.

A pushbutton 170, designated "DG API MEAS," corresponding to directional gyro, is actuable to either an autopilot or a compass position. The azimuth gyro simulator for the captain's side has two digital-to-synchro transmitters, autopilot and compass. The digital inputs are in parallel, whereas the analog output is isolated. Pushbutton 170 selects the transmitter to be measured via azimuth API, A, B switches 131, 132. The first officer's azimuth gyro simulator is identical. Pushbutton 170 selects the synchro transmitter to be measured, autopilot or compass, via the first officer's azimuth API A, B switches.

A pair of switches 181, 182 under the designation "TAS," corresponding to true airspeed, provide a means for commanding and reading out a manually selectable airspeed value. Thus, for example, with pushbutton 181 activated, the channel A readout of the hand-held unit will produce a reading of true airspeed, with the channel A touch and direction responsive sensor providing a means to manually alter the commanded true airspeed value.

Figure 3A:
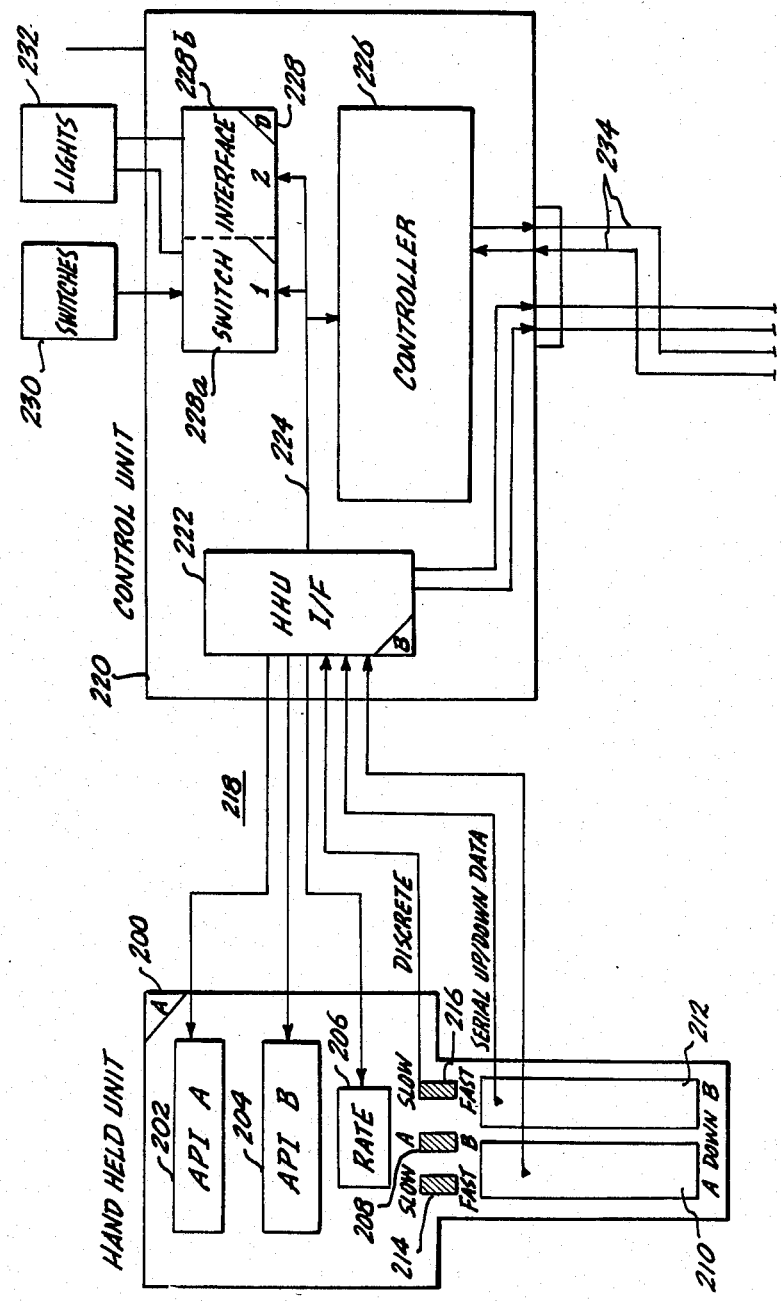
FIGS. 3A–3C are block diagrams illustrating the principal circuit blocks of the gyro simulator.
Figure 3B:
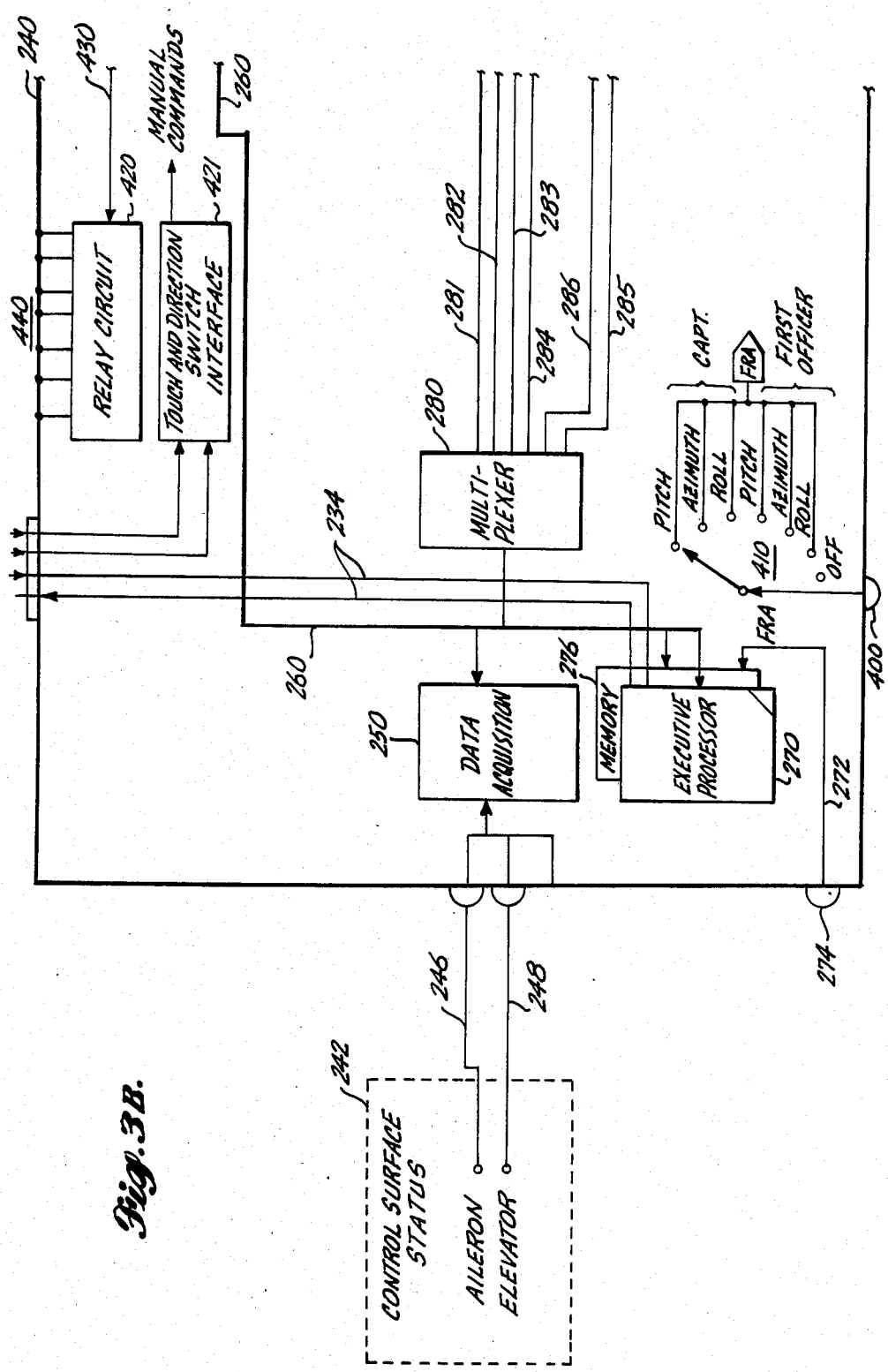
Figure 3C:
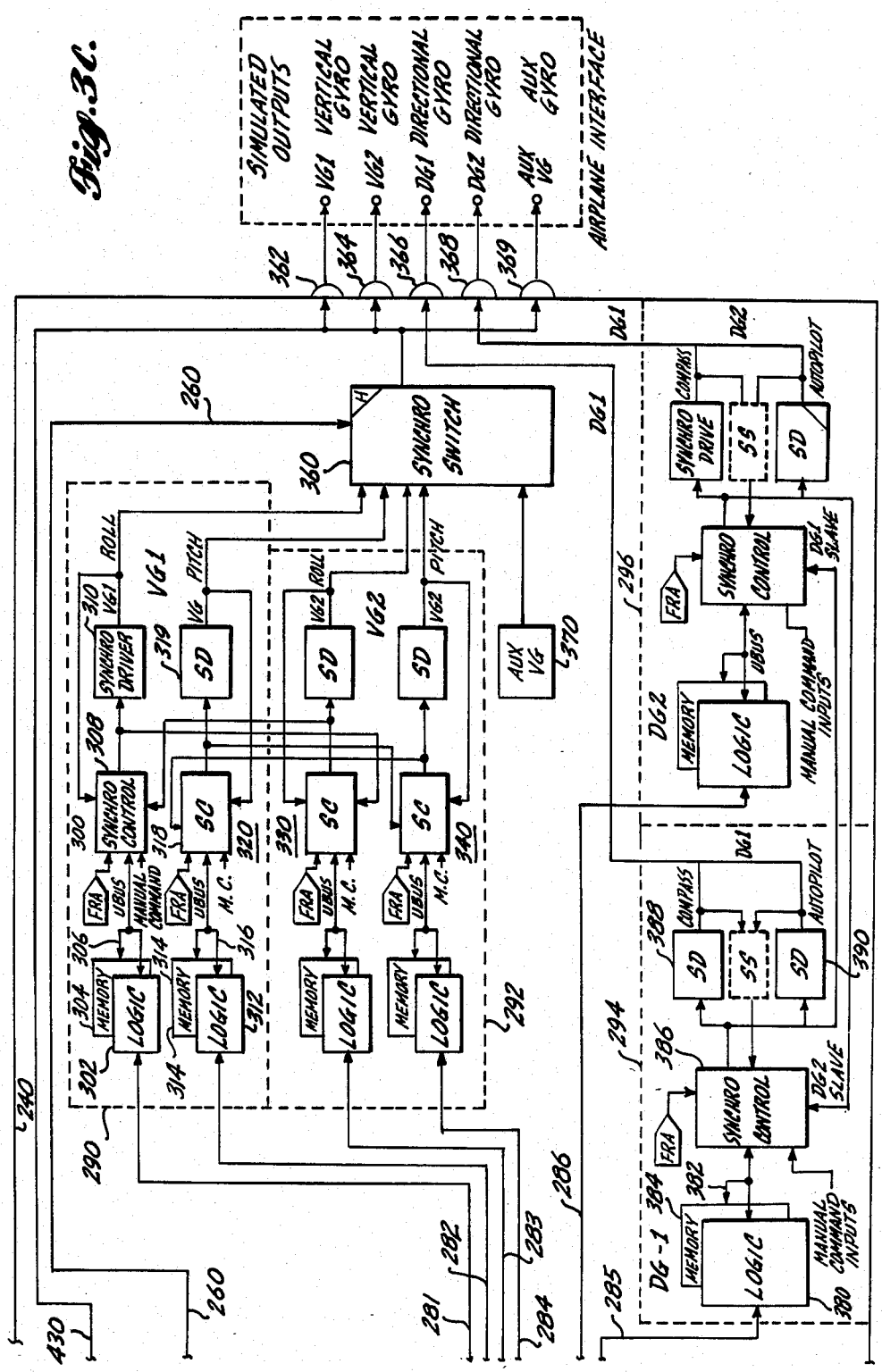

FIGS. 3A-3C are detailed block diagrams illustrating the principal circuit components of the preferred embodiment of the gyro simulator.

A hand-held unit 200 has three solid-state, digital readout displays 202 204 and 206. Displays 202 and 204 read the instantaneous values of the channel A and channel B, respectively, selected gyro signals. The third display 206 provides a readout of the rate of change of either the channel A or channel B selected gyro signal, as determined by a switch 208.

The selected A channel gyro signal may be manually varied by use of the touch activated pulse generator 210. Similarly, the value of the B channel gyro signal may be varied by touch activated pulse generator 212. The pulse generators 210, 212 provide serial up count information in response to the touch pad being activated in the "up" direction and serial down count data in response to activation of the touch pads in the "down" direction. The rate at which the pulses from the touch responsive pulse generators 210, 212 are generated may be controlled by the switches 214, 216, respectively.

In this, the preferred embodiment of the invention, the touch responsive pulse generators 210, 212 are comprised of commercially available units commonly known as "FERENSTATS" available from TASA Company, Santa Clara, Calif.

The signals to drive the displays 202, 204 and 206 and the signals from the pulse generators 210, 212 and switches 208, 214, 216 are carried over a bus, indicated generally at 218, to the control unit 220. There, they connect to a hand-held unit interface circuit 222. Interface 222 communicates, via an eight-bit bus 224, with a controller 226 and first and second portions 228A, 228B of a switch interface 228. Switch interface 228 receives inputs from the control unit switch set 230 and, in turn, drives appropriate switch related lights 232.

The controller 226, which, in this, the preferred embodiment of the invention, employs a standard Z80 microprocessor, is in communication with an executive processor contained within the electronics module over a conventional RS 232 link 234. Data is supplied to controller 226 on link 234 representing the instantaneous values of the various gyro signals being simulated. Controller 226, acting in response to the status of the switches 230 (FIG. 2), as decoded through switch interface 228, produces display signals on bus 224, which display signals are suitable for activating, through hand-held unit interface 222, the displays 202, 204 and 206 of the hand-held unit 200. Information on the status of the switches 230 is also routed by the controller 226 over the link 234.

In addition, controller 226 operates to activate selected lights 232 associated with the switches 230 in response to actuation of one or more of the switches 230. Such light activation signals are applied by controller 226 to the bus 224, whereby they are decoded in interface 228 coupled to the light set 232.

The electronics module is indicated at 240. Applied as an input to block 240 are analog signals representing the status of aircraft control surfaces at block 242. Thus, in the present embodiment of the invention, analog signals representing aileron position are coupled over a line 246, whereas signals representing elevator position are coupled over a line 248. These signals are commonly provided by linear variable differential transformers (LVDT's).

The control surface status signals are received by a data acquisition block 250. Block 250 includes an analog-to-digital converter which outputs the digitized control surface status information on an eight-bit bus line 260. Address and data flow on bus line 260 is controlled by an executive processor 270.

Additional inputs to the executive processor 270 include the RS 232 link 234 and a standard IEEE 488 bus 272 which connects to a jack 274 provided on the electronics module 240. Memory for executive processor 270 is provided by memory module 276, which is accessed by processor 270 via bus 260.

Executive processor 270 communicates, via bus 260, to various modules within the electronics module 240 assuring the proper formatting and timing of data and address flow among units tied to the bus. In addition, in the remote mode operation of the gyro simulator, executive processor 270 acts as an interface to an external computer input, applied at jack 274, allowing full computer control of all gyro simulator functions.

The digitized aircraft control surface status signals are coupled, via bus 260, to a multiplexer 280. Multiplexer 280, in a format prescribed by executive processor 270 over bus 260, routes selected control surface data signals out over six output lines 281-286. Thus, aileron status signals are passed to output lines 281-283, elevator status signals are passed over lines 282, 284 to pitch simulating channels.

Digitized roll angle information is passed to the directional gyro simultaneous circuits, via lines 281, 283, to the executive processor 270 and to the directional gyro circuits via lines 285 and 286.

LInes 281, 282 are coupled to the first vertical gyro simulating circuitry 290. Input lines 283, 284 are coupled to the second vertical gyro simulating circuitry 292 and lines 285, 286 are coupled to the first and second, respectively, directional gyro simulating circuits 294, 296.

The first vertical gyro simulating circuit 290 includes a first channel 300 for simulating a roll signal and a second channel 320 for simulating a pitch signal. Thus, aileron status signals on line 281 are passed to a logic circuit 302 of channel 300. Logic circuit 302 accesses associated memory 304 and a synchro control circuit 308, via an associated twelve line bus 306.

Also applied as inputs to synchro control circuit 308 are the manual command signals, as provided by the hand-held unit interface block 222 through interface 421 and a frequency response analyzer input (FRA), described below. The output from synchro control circuit 308 couples to a synchro driver circuit 310, the output of which is coupled both as an input to the synchro control circuit 308 and as a roll signal input to a synchro switch 360.

Operation of channel 300 is understood as follows. The synchro control block 308 and logic 302 respond to input signals corresponding to a commanded roll rate, a commanded true airspeed signal and the status of the ailerons to calculate, in conjunction with equations of flight for the particular aircraft under test stored in memory 304, a roll signal. This signal is digital to analog converted by synchro driver 310 into a simulated roll signal, suitable for use by an aircraft's flight control system. The roll signal is then analog to digital converted in synchro control circuitry 308 and, ultimately, routed back to the hand-held unit interface block 222 to drive the displays 202, 204 and 206.

The pitch channel 320 of the first vertical gyro block 290 operates in a manner similar to roll channel 300. Thus, signals representing the status of the elevators are passed, via line 282, to a logic circuit 312. Logic circuit 312 communicates with a memory 314 and a synchro control block circuit 318, via a bus 316. The output from synchro control circuit 318 is applied to a synchro driver block 319 which thereby produces the simulated pitch signal. This signal is coupled both to the synchro switch 360 and is fed back to the synchro control circuit 318. Inputs to the synchro control circuit 318 include a frequency response analyzer signal "FRA" and the manual command signals as supplied by the hand-held unit interface block 222 via interface 421.

Channel 320 responds to the commanded airspeed signals, the commanded pitch signals and the status of the elevators to calculate, via the equations of flight stored in memory 314, a simulated pitch signal. This signal is processed in the synchro control circuit 318 and is digital to analog converted in the synchro driver circuit 319 into a suitable pitch signal. Also, the synchro control circuit 318 analog to digital converts the produced simulated pitch signal and ultimately feeds this signal back through the hand-held unit interface block 222 to drive the appropriate readouts 202, 204 and 206.

The second vertical gyro block 292 has a roll channel 330 and a pitch channel 340 which operate in a manner identical to that described above with respect to channels 300, 320, respectively. It should be noted, however, that the synchro control circuits for each roll channel 300, 330, as well as for each pitch channel 320, 340 have SLAVE inputs coming from the output of the corresponding synchro control circuit. Thus, when the system is operated in the MASTER/SLAVE mode, that vertical gyro channel identified as the SLAVE produces an output simulated signal which tracks the corresponding vertical gyro MASTER designated channel.

The pitch and roll signals produced by the first and second vertical gyro blocks 290, 292 are passed to the synchro switch 360. Synchro switch 360 includes suitable circuitry, such as a Scott T circuit, which combines the pitch and roll signals from each of the vertical gyro blocks to produce a corresponding synchro signal. Thus, the vertical gyro produced synchro signal is coupled out of synchro switch 360 to an output connector 362. The second vertical gyro signal is coupled to an output 364. A further input to synchro switch 360 is the output from the auxiliary vertical gyro block 370. Block 370 is designed to produce a constant zero degree output signal. In response to suitable signals applied to bus 260, and originating with the switches 230 associated with the control unit 220, synchro switch 360 can cause the auxiliary vertical gyro produced signal 370 to be coupled through either to output 362 or output 364 in place of the corresponding first and second vertical gyro block produced signals.

The first and second directional gyro blocks 294, 296 produce their corresponding outputs in a manner very similar to vertical gyro blocks 290, 292. Thus, referring to the first directional gyro block 294, control surface input signals are passed over line 285 to logic circuit 380. Logic circuit 380 communicates over a bus 382 with an associated memory module 384 and a synchro control circuit 386. Also applied as inputs to the synchro control circuit 386 are a frequency response analyzer "FRA" signal and the manual command inputs, as provided by the hand-held unit interface 222 via interface 421.

In the case of the directional gyro blocks, the synchro control circuit 386 is coupled both to first and second synchro drivers 388, 390. The outputs from synchro drivers 388, 390 are designated "COMPASS" and "AUTOPILOT," respectively. These outputs correspond to two electrically isolated, mechanically coupled synchro transmitters within one real directional gyro.

Also, the outputs from synchro drivers 388 and 390 are fed to a SS block 392. Synchro select block 392 is driven by pushbutton 170 identified as "DG API MEAS." The output of synchro drive 388, or of synchro drive 390, is available for display on the hand-held unit.

In operation, the first directional gyro block 294 responds to manual command input signals of commanded azimuth and/or true airspeed, as well as control surface status signals to calculate, in conjunction with equations of flight stored in memory 384, a corresponding azimuth signal. This signal is processed in synchro control circuit 386 and digital to analog converted through synchro drivers 388, 390 to comprise the simulated azimuth signal.

The second directional gyro block 296 produces a simulated azimuth signal in a manner identical to that described with respect to the first directional gyro block 294. Thus, the first and second directional gyro simulated azimuth signals are provided at output terminals 366 and 368 on the electronics module. It should be noted that the synchro control circuits of the first and second directional gyro blocks 294, 296 have an interlinking MASTER/SLAVE relationship, as was discussed with respect to the vertical gyro simulating circuits.

A final output connector 369 on the electronics module 240 corresponds to a constant zero degree auxiliary vertical gyro signal.

Various simulated outputs are coupled to the corresponding aircraft systems requiring such gyro signals.

It is often desirable to test the frequency response of various aircraft systems which receive gyro signals. The gyro simulator provides a means to excite the system with a desired signal, such as a low frequency sine wave, or a random noise signal waveform simulating turbulence, to monitor system response. This is accomplished through use of the frequency response analyzer "FRA" input terminal 400. A waveform generator which generates the desired test signal is coupled to input 400. A switch 410 allows the test signal to be coupled to a selected one of the pitch, roll and azimuth channels of either of the first or second vertical or directional gyros. Thus, for example, in the position shown in FIG. 3, the test signal is coupled to the synchro control circuit 318 of the first vertical gyro block 290. Synchro control circuit 318 modulates the produced pitch signal with the frequency response test signal.

The present gyro simulator, therefore, provides a convenient means for exciting any one of the simulated gyro signals with a test signal.

A relay circuit 420 connects both to the bus 260 and to a line 430 which carries the various gyro signals. In this, the preferred embodiment of the invention, the produced gyro synchro signals are in the form of an amplitude and phase-dependent 400 hertz signal. Relay circuit 420 compares the 400 hertz produced synchro signals with a reference 400 hertz signal supplied by the aircraft under test. Circuitry within relay circuit 420 compares the aircraft's applied signal to the synchro simulated signals, and if a proper phase relationship exits therebetween, appropriate indicators 440, each corresponding to a simulated gyro signal, are activated.

Figure 4A:
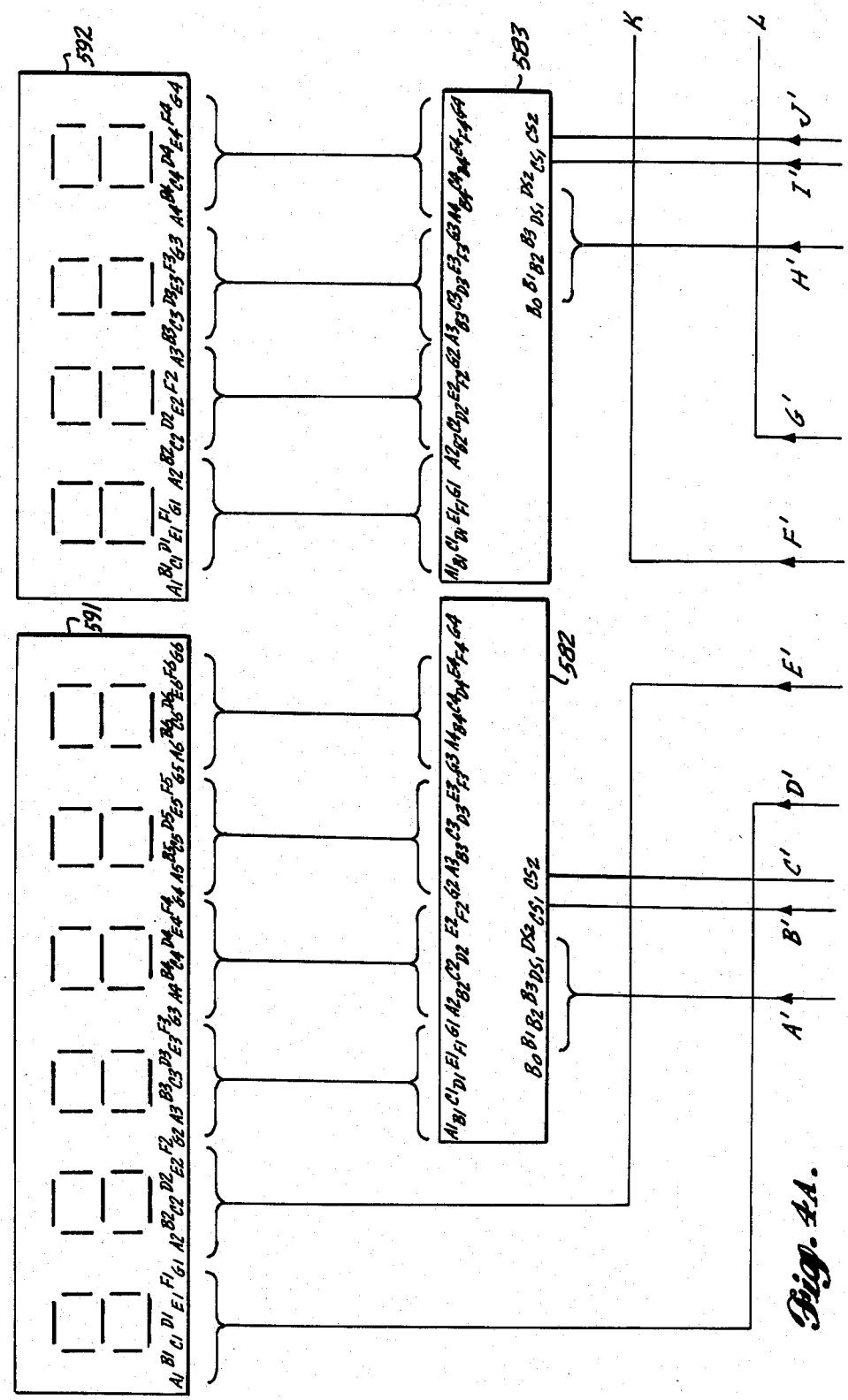
FIGS. 4A–4C are detailed schematic diagrams of the hand-held unit circuit assembly.
Figure 4B:
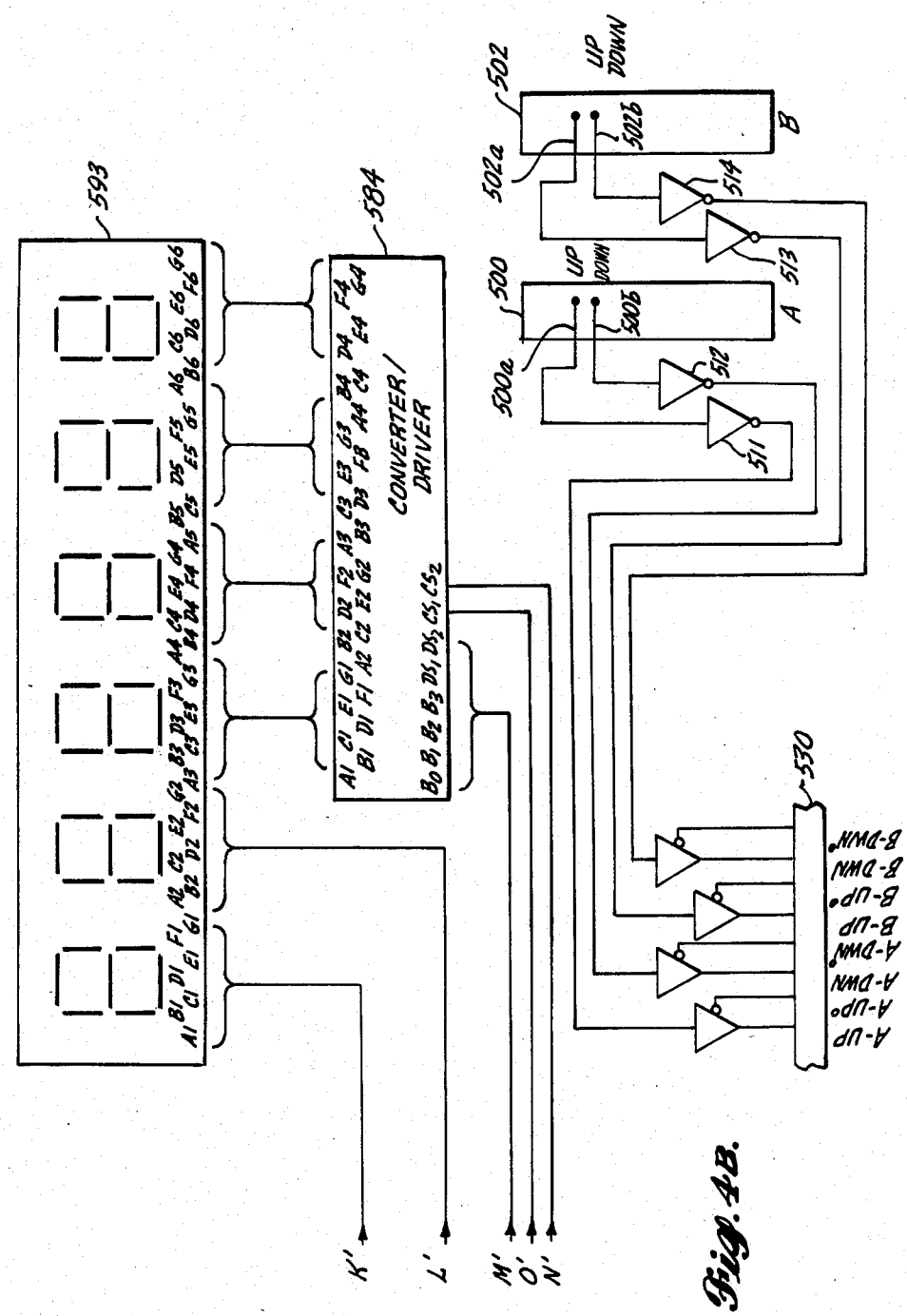
Figure 4C:
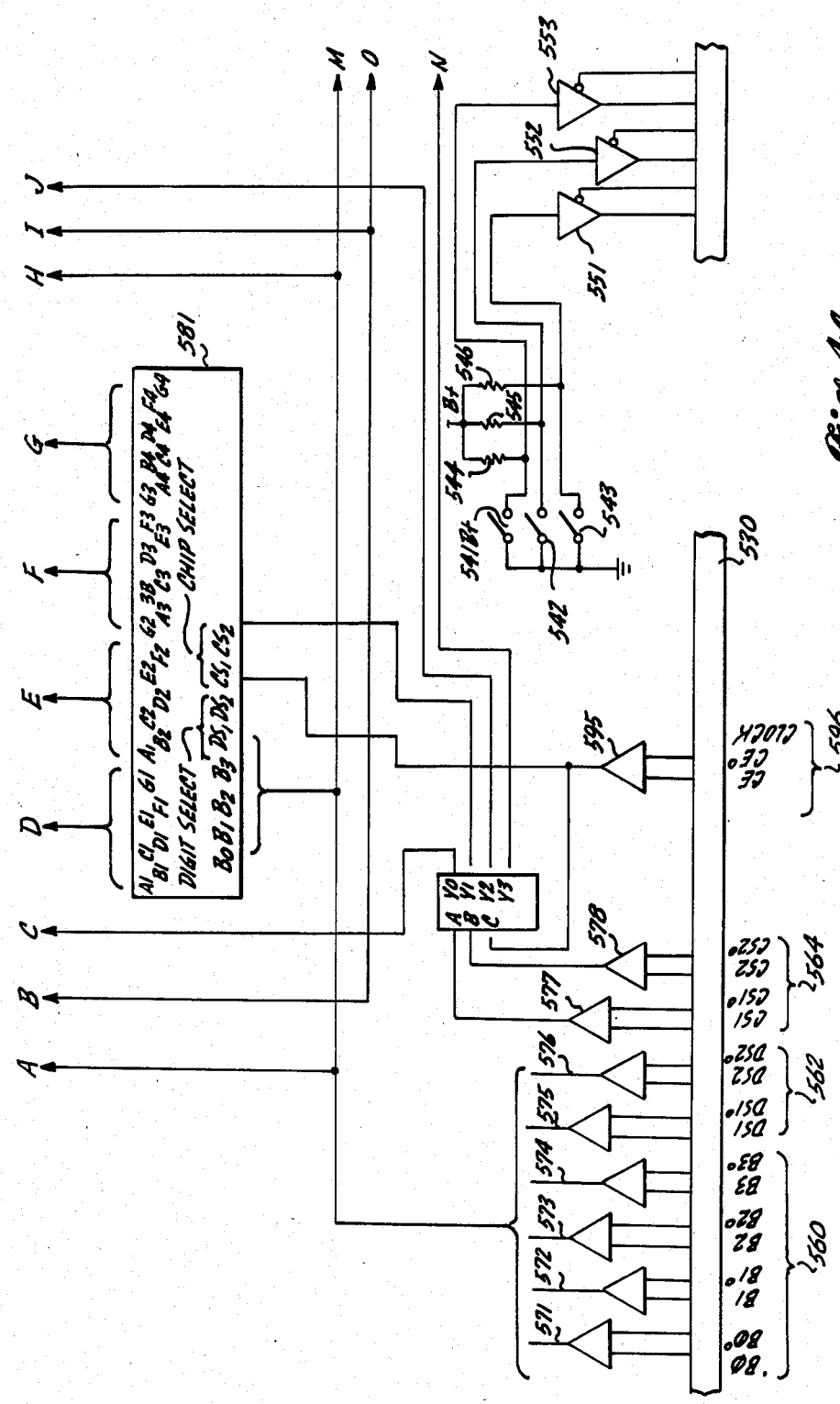

FIGS. 4A-4C are detailed schematic diagrams of the hand-held unit (unit 10 of FIG. 1). The unit includes a pair of touch and direction sensitive switches 500, 502 corresponding to the A and B channels, respectively. The switches 500, 502 operate to produce a string of "up" pulses on their up lines 500a, 502a in response to the switch contact area being stroked in the up direction. Similarly, a string of down pulses are produced on down lines 500b, 502b in response to the contact area being stroked in the down direction. The frequency of the pulses produced on the up or down lines is a function of the rate at which the contact areas are stroked.

The output lines from the touch and direction switches 500, 502 are buffered via buffers 511-514, with each being converted to a differential output via amplifiers 521-524 for transmission via connector 530 to the control unit (FIG. 5).

Three switches 541-543 provided on the hand-held unit are grounded at one terminal and connected to a source of voltage B+ through resistors 544-546. The first and third switches 541, 543 determine whether the rate of change of the selected channel A and channel B, respectively, parameter will occur at a fast or a slow rate in response to the touch and direction sensitive switches. The second switch 542 determines whether the rate display is that of the A or the B channel selected parameter. The low or high output states from switches 541-543 are coupled through amplifiers 551-553, which provide differential outputs to appropriate terminals on connector 530.

The command outputs from the touch and direction sensitive switches 500, 502 and switches 541-543 are passed to the control unit and electronics module for simulation of the appropriate gyro signals. In turn, this circuitry monitors the instantaneous values of the channel A and channel B selected gyro parameters, as well as the rate of the selected channel A or channel B signal, and feeds this information back to the hand-held unit.

Thus, applied as four differential inputs 560 to connector 530 are signals corresponding to those segments of a seven-segment display which should be activated to display a particular parameter value. A pair of differential inputs 562 correspond to that one of several digits to be activated. Finally, a pair of inputs 564 determine which one of several seven-segment display driver chips should be activated to display the desired values.

Each of these differential inputs is converted to a single ended output via amplifiers 571-578.

The output from amplifiers 571-576 are coupled via a six-line bus to the inputs of four four-digit liquid crystal display multiplexed driver circuits 581-584. In this, the preferred embodiment of the invention, the display driver circuits used are Type 7211 integrated circuits.

The chip select signals out of amplifiers 577, 578 are two-to-four line decoded, via circuit 586 (Type LS 139 integrated circuit), whose four outputs feed to each of the display drivers 581-584.

Each display driver has seven-segment output buses which feed to a corresponding one of the digits on three liquid crystal seven-segment displays 591-593. The first and third displays 591, 593 are used to display the channel A and channel B instantaneous gyro values. The second display 592 is used to display the rate of change of either the channel A or channel B selected gyro value.

Also coupled to each display driver circuit 581-584 is a clock enable pulse as supplied out of amplifier 595. This pulse is differential to single ended converted in amplifier 595 and is supplied as an input pair 596 to connector 530.

Operation of the circuit of FIGS. 4A-4C is understood as follows. A signal on the differential input pair 564 indicates which one of the four chips 581-584 is to be activated. A particular digit on the selected chip is selected via the differential pair 562. Those segments of the selected digit on the selected chip are programmed in via the differential inputs 560. Once the data is stabilized, a clock pulse on input 596 causes the selected value to be clocked through the appropriate driver 581-584 to activate an appropriate one of the liquid crystal display digits. In this way, any desired value may be displayed on displays 591-593.

Figure 5A:
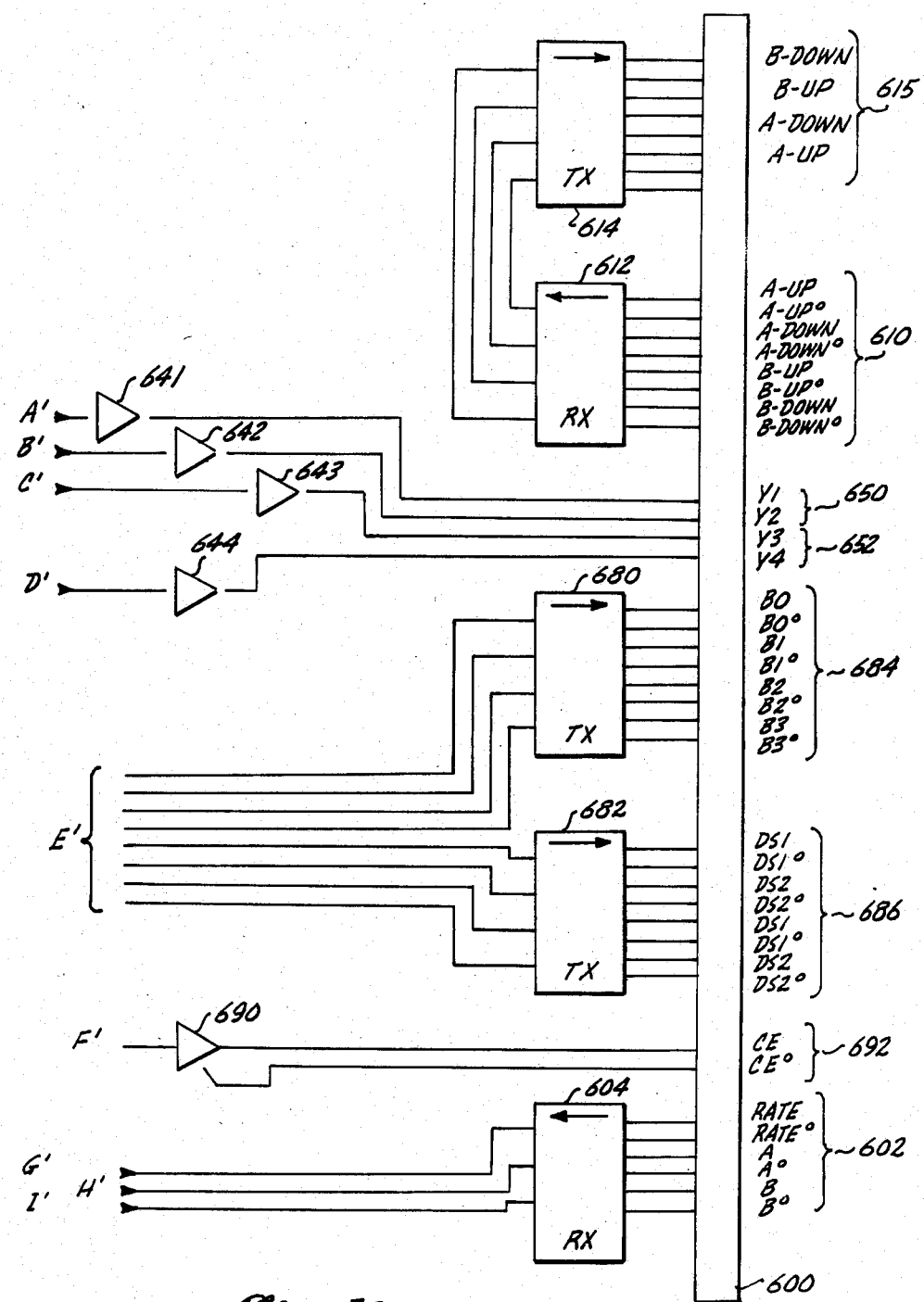
FIGS. 5A, 5B are detailed schematic diagrams of the control unit hand-held interface circuitry.
Figure 5B:
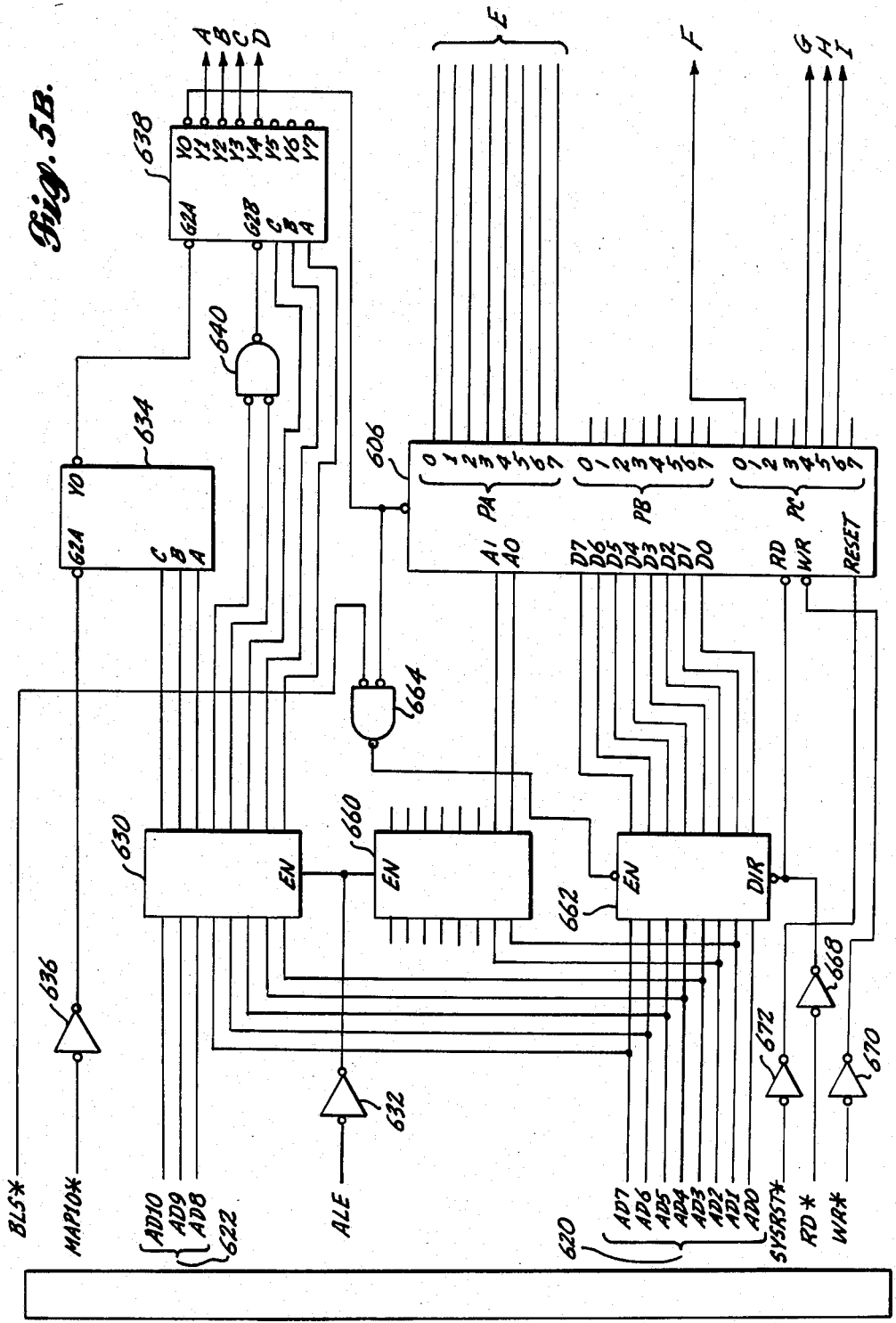

FIGS. 5A, 5B are detailed schematic diagrams of the hand-held unit interface circuit 222 as shown in FIG. 3.

This unit receives, via suitable inputs 602 on terminal 600, the differential signals corresponding to rate, channel A, and channel B select as provided from switches 541-543 (FIG. 4) on the hand-held unit. The signals are processed through a three-state RS 422 differential receiver 604 (Type 26 LS 32). The resulting single ended outputs from receiver 604 are supplied as inputs to the third interface grouping PC of a programmable peripheral interface chip 606 (Type 8255A).

The differential touch and direction sensitive switch signals are coupled to appropriate inputs 610 of terminal 600. The signals are in turn passed through a three-state RS 422 differential receiver 612 (Type 26 LS 32) and a corresponding three-state RS 422 differential transmitter 614 (Type 26 LS 31) where they are provided as output group 616 on terminal 600. Thus, receiver 612 and transmitter 614 operate to buffer the touch and direction sensitive switching signals.

Control to the circuit of FIG. 5 is provided by the controller (226 of FIG. 3) associated with the control unit. The controller utilizes an eight-bit data bus 620 and a three-bit address bus 622. In addition, the controller has control lines identified as BLS*, MAPIO*, ALE, SYSRST*, RD* and WR*. The BLS* line is a bus low strobe which assumes a low state when data is being transferred.

The MAPIO* line indicates whether memory or input/output mapping is being performed and assumes a low level when the processor is talking to the hand-held interface circuit of FIG. 5.

The ALE line is an address latch enable which operates to latch data whenever a valid address has been identified.

The SYSRST* signal is a system reset signal which assumes a low state during power up, or other desired reset intervals.

The RD* signal assumes a low level whenever the controller is receiving or reading data. Its complement, the WR* line, assumes a low level whenever data is being written from the controller to the circuit of FIG. 5.

The controller addresses the circuit of FIG. 5 by putting an appropriate three-bit address on address lines 622. In the present instance, the appropriate address is 000. This address signal is applied to inputs of an eight-bit transparent latch 630 (Type LS 373). Upon receipt of an enable pulse coupled through buffer 632 from the address latch enable line, latch 630 couples the three-bit address to corresponding output lines. These output lines in turn connect to the A, B and C inputs of a three-to-eight line decoder/demultiplexer 634 (Type LS 138). Decoder 634, upon receiving a suitable low input as buffered through buffer 636 from the MAPIO*, decodes its A, B and C inputs. If A=B=C=0, then the Y0 output of decoder 634 goes low, thereby indicating a proper received address.

The Y0 output from decoder 634 is coupled to a G2A input of a three- to eight-line decoder/demultiplexer 638 (Type LS 138). Also input to decoder 638 are data lines AD3-AD7 from the controller as latched through latch 630. As shown, the AD6 and AD7 data lines are passed through gate 640 before being input as a G2B input to decoder 638.

If decoder 638 receives a low signal on its G2A input, indicating a proper address, it decodes its three input lines A, B and C into eight output lines Y0-Y7. It is noted that only output lines Y0-Y4 are used.

A low decoded Y0 output from decoder 638 enables programmable peripheral interface 606, thereby causing a data transfer. Similarly, a low output on any other decoded output Y1-Y4 is passed through an appropriate buffer 641-644 and connects to first and second output terminal sets 650, 652 on connector 600. The first terminal set 650 is routed to the electronics module switching interface circuitry as shown in FIG. 7, whereas the second terminal output pair 652 is passed to the electronics module switch interfacing circuitry shown in FIG. 8.

Data lines AD1 and AD2 are passed through an eight-bit transparent latch 660. When enabled, via an appropriate ALE line level, latch 660 passes these two addresses to the address inputs A0, A1 of the programmable peripheral interface 606.

Data lines AD0-AD7 are also passed through an octal bidirectional bus interface 662 (Type LS 245). Octal interface 662 has an enable input, which is driven by gate 664 having as inputs the BLS* signal and the output Y0 from decoder 638. Thus, octal interface 662 is enabled when the controller is addressing the circuit of FIG. 5.

An additional input to octal interface 662 is a direction input "DIR". This direction input is driven by the RD* line through a buffer 668. With the "DIR" input low, information is passed from the right-hand to the left-hand terminals of interface 662. With the "DIR" input high, data flows from the left-hand side terminals to the right-hand side terminals.

The eight output lines from octal interface 662 are passed to the data inputs D0-D7 of the programmable peripheral interface 606.

In addition, the programmable peripheral interface receives the read signal at its input RD*, and the write signal at its input WR* as buffered through buffer 670. Finally, programmable peripheral interface 606 receives a reset signal, at its "RESET" input, as buffered through buffer 672.

Programmable peripheral interface 606 has a set of first peripheral outputs PA which feed to a pair 680, 682 of three-state RS 422 differential transmitters (Type 26 LS 31). The outputs from the transmitters 680, 682 are connected to terminals 684, 686, respectively, on connector 600. The signals at terminals 684, 686 are seen to be the seven-segment driver signals which are coupled to the hand-held interface of FIG. 4.

Finally, the ZERO position output terminal from the third peripheral interface grouping PC on programmable peripheral interface 606 is differentially output, via amplifier 690, to terminals 692 on connector 600. Terminal 692 corresponds to the clock enable signal which is coupled to the hand-held interface of FIG. 4.

Operation of the circuit shown in FIG. 5 may be understood as follows. To read data from, or write data to, the circuit of FIG. 5, the control unit processor applies the appropriate address on the address inputs 622. This address is decoded by the decode logic comprised by decoder 634 and decoder 638. If the processor wishes to read the switch position data as input at terminal 602 and passed through transmitter 604, the read input "RD" of programmable peripheral interface 606 is taken low, as is the direction input "DIR" of octal interface 662. In addition, the appropriate address of the third group, PC of interface connections is input at address inputs A0, A1. Now, data is routed from the PC terminals to the D0-D7 terminals of interface 606. In turn, these signals are passed through the octal interface 662 to the appropriate data lines AD0-AD7.

When the controller wishes to write data to the circuit of FIG. 5, it drives the RD* line high, and the WR* line low. This reverses the direction of octal interface 662 and switches programmable peripheral interface 606 to its write mode. By an appropriate address of the first interface groupings PA on interface inputs A0, A1, data is then transferred from the D0-D7 inputs to the PA outputs. This data will be, in fact, the calculated instantaneous values of the selected gyro signals, along with the corresponding rate of one of these selected values, which are to be read out on the hand-held unit. This data is, therefore, coupled through the transmitters 680, 682 to the display terminals 684, 686 of connector 600.

Figure 6:
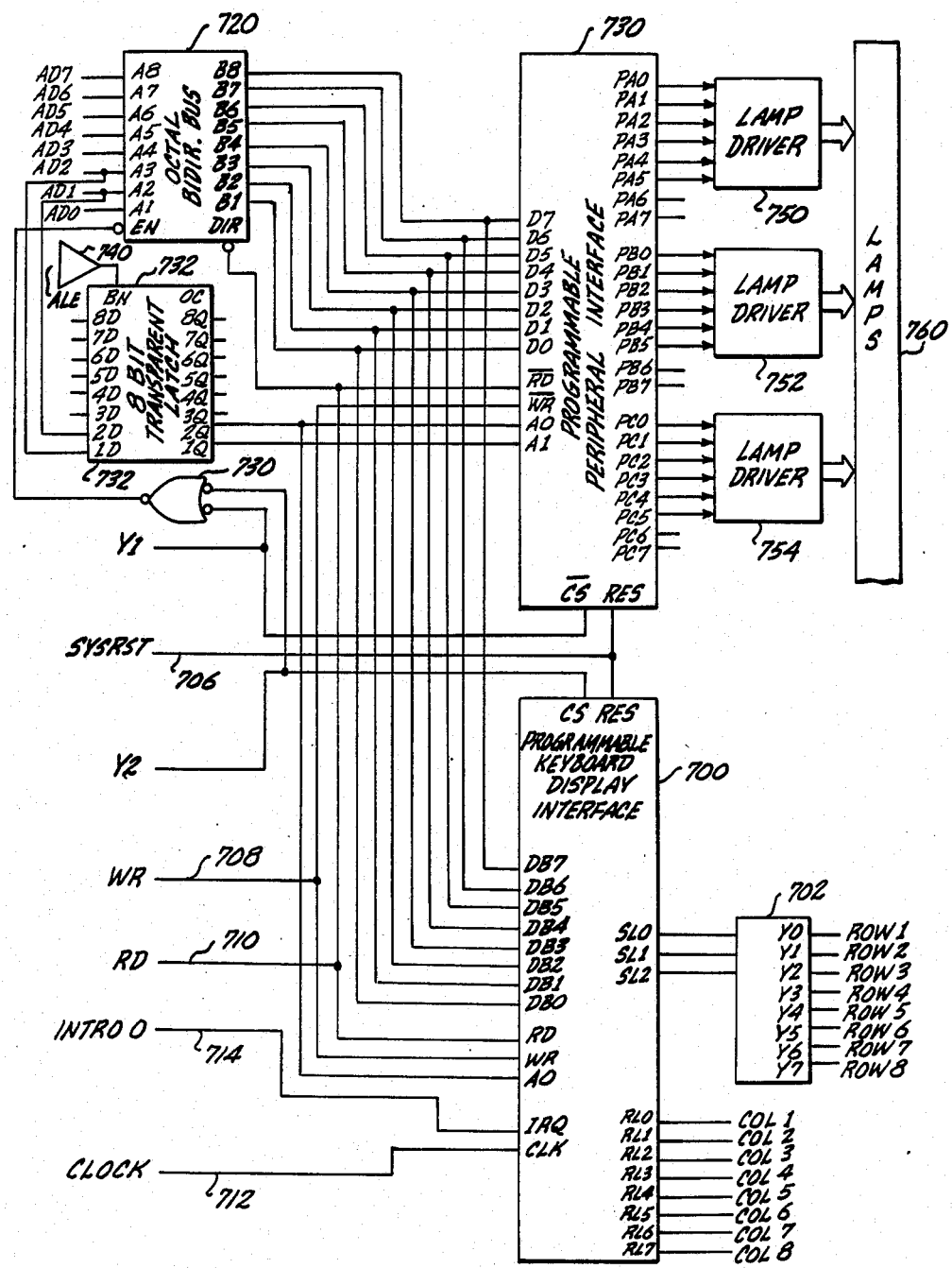
FIG. 6 is a detailed schematic diagram of the control unit switch interface circuitry.

FIG. 6 is a detailed schematic diagram of the switch interface circuitry 228 as shown in FIG. 3. It is the function of this circuitry to monitor the status of each switch in the control unit (FIG. 2) and relay this information to the controller. In addition, the circuitry activates lamps associated with each of the switches when the corresponding switch is activated.

The basic unit which senses the status of each of the control unit switches is a programmable keyboard display interface circuit 700 (Type 8279). Switch status is accomplished by sensing the row and column of each switch. Thus, if a switch in any of control unit columns 1-8 is activated, a corresponding input RL0-RL7 of interface 700 is activated. If a switch in any one of eight rows of the control unit is activated, this is sensed, via a line decoder/demultiplexer 702, which then passes this coded row information to the corresponding inputs SL0-SL2 of interface 700.

Interface 700 is under control of the controller (226 in FIG. 3) associated with the control unit. Thus, inputs to interface 700 include a system reset line 706, a write line 708, a read line 710 and a clock line 712. In addition, interface 700 produces an activated output on its IRQ line 714 to tell the controller that one of the switches has been activated. Interface 700 is addressed by the controller via the Y2 signal, which is a result of the address decode logic shown in FIG. 5.

The eight data lines DB0-DB7 from interface 700 connect to the data lines AD0-AD7 of the controller through an octal bidirectional bus 720 (Type LS 245).

Also connected to the controller data lines AD0-AD7 through the octal bidirectional bus 720 is a programmable peripheral interface 730 at its data lines D0-D7. Interface 730 receives the system reset line 706 and the read and write lines 710, 708. The controller addresses interface 730 via the Y1 address signal, which is provided via the decode logic shown in FIG. 5. Circuitry within interface 730 connects the data lines D0-D7 to any one of the three peripheral connections PA, PB or PC by means of the address lines A0, A1. These address lines are activated via an eight-bit transparent latch 732 (Type LS 373) which latches in the two-bit address via the data lines AD1, AD2.

Finally, the octal bidirectional bus 720 is enabled in response to the presence of either a Y1 or a Y2 signal, as sensed by a gate 736.

Transparent latch 732 is enabled via the address latch enable line 740 from the controller.

The three output groups PA, PB and PC from the programmable peripheral interface 730 feed to corresponding lamp driver circuits 750, 752 and 754, which, in turn, are connected to appropriate ones of the lamp bank 760.

Operation of the circuit of FIG. 6 is understood as follows. The controller reads the status of the control unit switch matrix by driving read lines 710 low and applying the appropriate address Y2 to the input of interface 700. The status of the switch matrix is then output from the interface at data lines DB0-DB7 and passed through bus 720 to the data lines AD0-AD7 of the controller.

In accordance with controller programming, it responds to the status of the switches to, inter alia, activate the programmable peripheral interface 730, via the Y1 signal, and couple, through bus 720, appropriate signals to the interface 730 inputs D0-D7 with an appropriate address input A0, A1 such that suitable lamp signals appear on one of the three output interface groups PA, PB, or PC. These signals are then amplified by lamp drivers 750, 752 and 754 and applied to the appropriate lamps in the lamp banks 760.

Figure 7B:
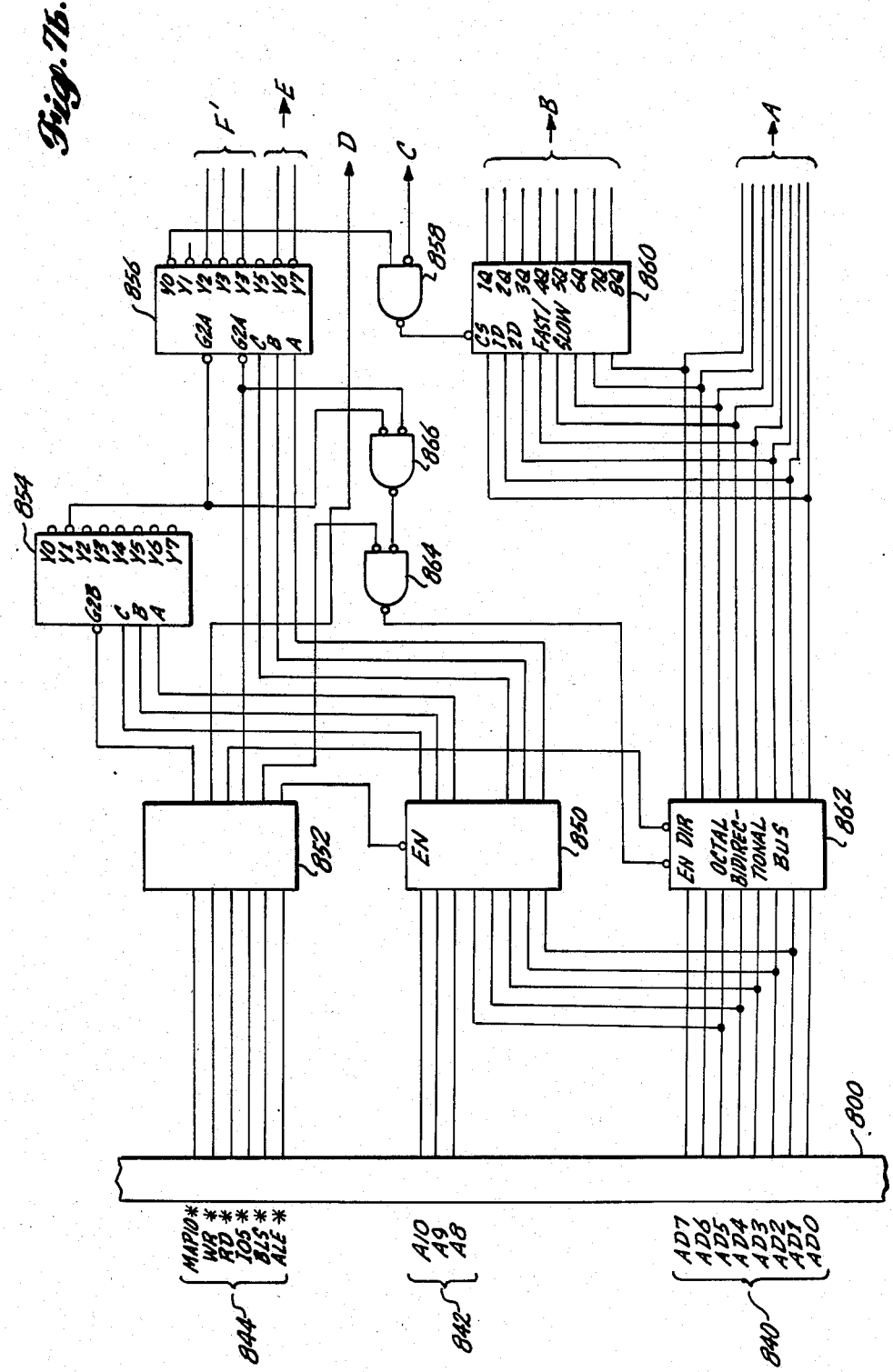
Figure 7C:
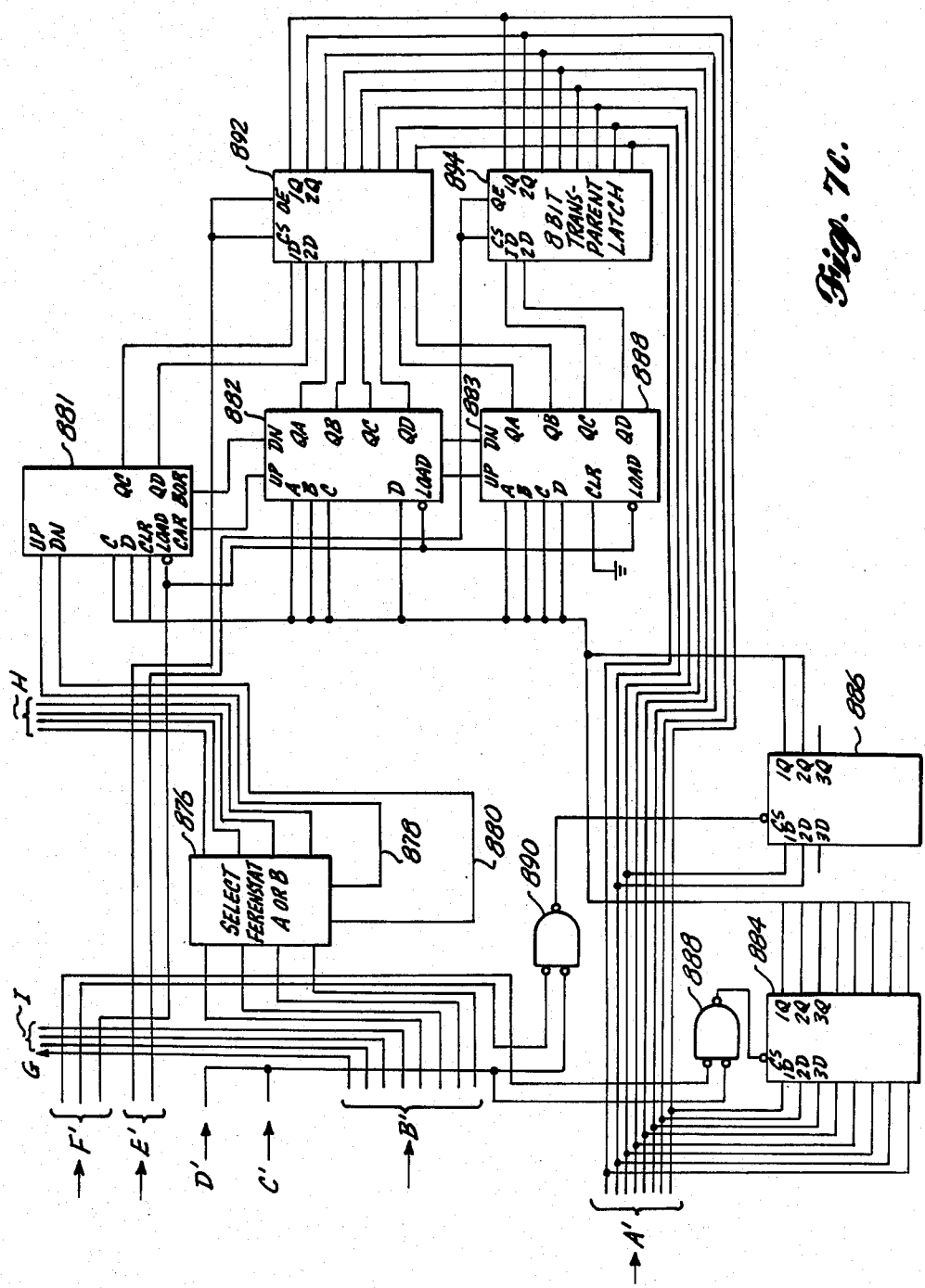

FIGS. 7A-7C are detailed schematic diagrams of the touch and direction sensitive switch interface, identified as 421' in FIG. 3.

The touch and direction sensitive switch pulses, as produced at the hand-held unit and buffered through buffers 612, 614 of FIG. 5, are coupled to an input contact group 802 of connector 800. These signals are then converted from differential to single ended form by the three-state RS 422 differential receiver 806 (Type 26 LS 32). Each signal is then input to one of four gates 811-814. The remaining input to each gate 811-814 is the output from a corresponding gate 821-824. Gates 821-824 have a further input provided by the output from a pulse generator 830.

It will be recalled that the hand-held unit has switches providing for fast or slow rate of change of the selected gyro signal in response to activation of the touch and direction sensitive switches. The function of pulse generator 830 is to produce multiple pulses within the normal pulse produced by the touch and direction sensitive switch such that, via the gates 811-814 and 821-824, when a fast rate of change is required, the pulse generator pulses are interposed within the pulses produced by the touch and direction sensitive switches, thereby implementing the fast rate of change mode. The logic for providing the gating function is understood as follows.

The touch and direction sensitive interface circuit of FIG. 7 is under the control of the executive processor (unit 276 in FIG. 3) which is provided in the electronics module. Data from the executive processor appears at contact group 840 and includes eight data lines AD0-AD7. Three address lines A8-A10 are provided at contact group 842. Finally, six processor command controls are provided at contact group 844. These controls include a MAPIO*, a WR*, a RD*, a BLS* and a ALE* which are similar to those commands as discussed with respect to FIGS. 5 and 6. An additional input command, labelled IO5*, is a line which assumes a low state when the executive processor memory is within its No. 5 location, thus indicating communication with the interface circuit of FIG. 7.

The executive processor addresses the interface circuit of FIG. 7 by applying an appropriate address on the address lines A8-A10. This address is applied to the input side of an eight-bit transparent latch 850. Latch 850 is enabled by receiving a suitable ALE* signal, buffered through octal buffer 852. The three-bit address is then passed to the A, B, and C inputs of a three- to eight-line decoder/demultiplexer 854 (Type LS 138). Decoder 854 is enabled by an appropriate MAPIO* signal, as buffered through octal buffer 852. In the present example, the appropriate input address requires that the Y1 output of decoder 854 assume a low state.

The status of the Y1 output from decoder 854 is passed as an enable input to a three- to eight-line decoder/demultiplexer 856 (Type LS 138). Also applied as an enable input to decoder 856 is the IO5* signal, as buffered through buffer 852. The A, B and C input lines to decoder 856 are coupled to the processor data lines AD1-AD3, as latched through latch 850. Thus, if decoder 856 receives the proper enable signals, corresponding to the address of the interface circuit shown in FIG. 7, it responds by activating one of its output lines Y0-Y7 in response to the three-bit signal appearing at its inputs A-C.

If the processor has determined that one of the fast/slow switches associated with the touch and direction sensitive switches on the hand-held unit has been activated to its "fast" position, the A-C input lines to decoder 856 cause the Y0 output line to be activated. A gate 858 senses for the activated Y0 line, along with a WR* command as buffered through octal buffer 852, to enable an eight-bit, positive edge triggered register 860. Register 860 receives at its input the eight-bit data line, as buffered through an octal bidirectional bus 862. The direction of information transfer on bus 862 is determined by the status of the RD* signal. Further, bus 862 is enabled in response to address gates 864, 866 which sense for the presence of a proper address to this interface circuit.

Register 860 operates as the fast/slow control. When it receives an enable signal out of gate 858, it will pass the eight-bit signal appearing at its input to its output terminals. The data presented on data lines AD4–AD7, and passed through bus 862, as such as to indicate whether the A or the B channel is to be operated in its fast up or fast down modes. Thus, if the B channel is to operate in its fast mode, the 1Q output from register 860 is activated, thereby activating pulse generator 830. An activated 2Q output from register 860 indicates that the A channel is to operate in its fast mode.

The pulses produced by pulse generator 830 are gated into the touch and direction sensitive switching produced pulses by the activation of the 3Q output from register 860 for the A channel, and activation of the 4Q output for the B channel.

The resultant pulses out of gate 811–814 are buffered through octal buffer 870 and are provided as output contact group 872 to output connector 874.

As discussed above, by setting an appropriate switch in the control unit, the touch and direction switches may be used to input to the system a desired true airspeed signal level. In this mode, an appropriate address on data lines AD4–AD7 is coupled through the register 860 to switching circuit 876. Input to switching circuitry 876 are the A up, A down, B up, B down pulses as supplied out of gates 811–814, respectively.

The logic on data lines AD4–AD7 causes switches within switching circuit 876 to couple either the A, or B up pulses to a line 878 or the channel A, or B down pulses to a line 880. Thus, the logic levels on data lines AD4–AD7 correspond to whether the A or B channel associated with a hand-held unit has been selected as the channel to input true airspeed data and whether the associated touch and direction sensor switch has been activated in either its up or down mode.

The signals on lines 878 and 880 are connected to the up and down, respectively, inputs of a counter chain comprised of counters 881–883. The purpose of counter chains 881–883 is to count up to the desired true airspeed signal level. A preset value of true airspeed may be loaded into counting chains 881–883 via 8-bit registers 884, 886 (LS374). These registers may be preset with values appearing on the processor data lines AD0–AD7. The processor addresses registers 884, 886 by activating the Y2, Y3 outputs of decoder 856, the enable signal being carried through gates 888, 890. When the preset value is to be loaded into the counter chains 881–883, the processor activates output Y4 of decoder 856.

The present count state of the counter chains 881–883 may be latched into the eight-bit transparent latch pair 892, 894 (LS373). The processor may monitor the air speed count state of counter chains 881–883 by reading the output of latch 892, via an appropriate address on the Y6 output of decoder 856, and reading the output of latch 894, via an appropriate address on the Y7 output of decoder 856. This causes the latch pair 892, 894 to load their stored values back onto the bus which, via octal bidirectional bus 862, applies the signals to the data lines AD0–AD7. In this way, the executive processor monitors and stores the selected true airspeed value.

Figure 8B:
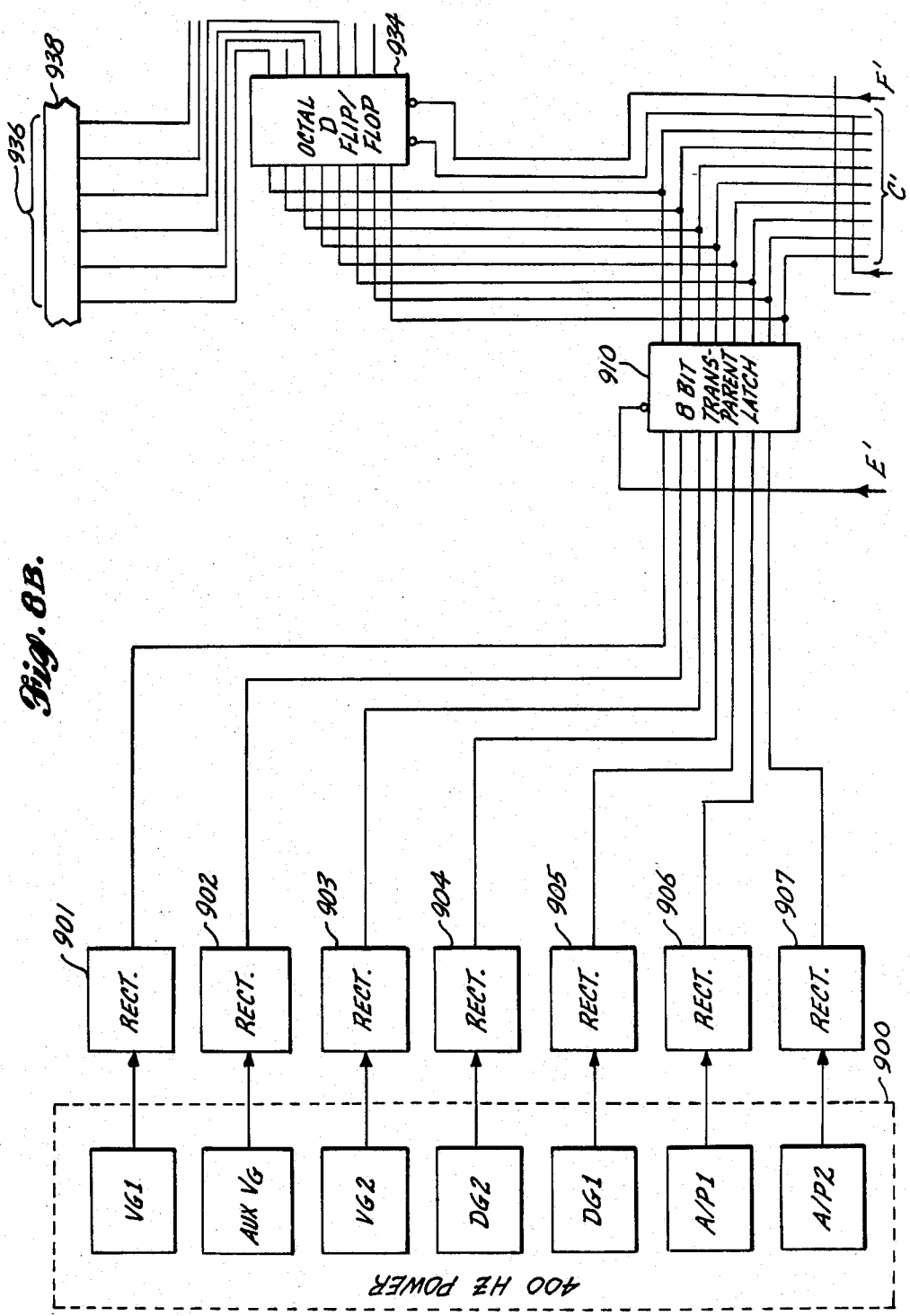

FIGS. 8A–8C are detailed schematic diagrams of the relay circuit 420 shown in FIG. 3.

In normal operation, the airplane supplies each gyro with a 400 hertz signal. Proper opration of the gyro requires that it receive this signal. Thus, in block 900 the 400 hertz power signal from each gyro (including the first and second vertical gyros VG1, VG2, the auxiliary vertical gyro AUXVG, the first and second directional gyros DG1, DG2 and the first and second auto pilot gyros A/P1, A/P2) is sensed and sent to a series of rectifiers 901–907. The output from each rectifier 901–907 is a positive DC value in the event that it is receiving a 400 hertz signal. These DC values are passed to an eight-bit transparent latch 910 (LS373). Latch 910 passes the rectified 400 hertz signals to the processor in a manner described below.

The executive processor (unit 270 of FIG. 3) provides a series of eight data lines AD0–AD7 at contact grouping 910 of connector 912. Three address lines A8–A10 are provided at contact grouping 914. A series of system commands are provided at contact grouping 916. The commands include, as before, system reset SYSRT*, map input/output MAPIO*, write WR*, read RD*, bus low strobe BLS*, address latch enable ALE* and a signal IO4 indicating that the executive processor is in its memory location corresponding to the circuit of FIG. 8.

The executive processor addresses the circuit of FIG. 8 by applying an appropriate address code on its address lines A1–A10. This code is passed to an eight-bit transparent latch 918 (LS373). Latch 918 is enabled in response to the ALE* line, as buffered through octal buffer 920. This causes the address code to be applied to the A, B and C inputs of a three- to eight-line decoder/demultiplexer 922 (LS138). Decoder 922 is enabled by a suitable MAPIO* signal, as passed through buffer 920. If the proper address is received at its A, B and C inputs, decoder 922 activates its Y1 output, thereby indicating proper address received. This signal is passed to an enable input of a three to eight-line decoder/demultiplexer 924 (LS138). Decoder 924 has a further enable input which is the buffered IO4 signal. At its A, B and C inputs, decoder 924 receives data lines AD1–AD3 as latched through the eight-bit transparent latch 918.

Decoder 924 provides the address to the various systems within the circuit of FIG. 8. Thus, if the executive processor wants to read the DC signals out of the rectifier group 901–907 to determine whether or not each gyro is receiving its 400 hertz signal, the processor causes an address to appear at the A, B and C inputs to decoder 924 which results in the Y0 output being activated. This enables latch 910, causing its input signals to latch to its output. These signals are then passed over the processor data lines AD0–AD7 through an octal bidirectional bus 926. Bus 926 is enabled, via gates 928, 930, which sense for the proper executive processor address. The direction of data flow carried by octal bus 926 is determined by the RD* signal, as passed through buffer 920.

The executive processor reads each rectified 400 hertz signal level and determines whether or not each gyro is receiving a suitable signal. The processor then notifies each synchro circuit, discussed herein below, as to the status of its corresponding gyro. This is accomplished by the processor applying an appropriate address on its data lines AD1–AD3 such that the Y2 output from decoder 924 is activated. This, along with an appropriate WR* signal, causes gate 932 to clock an octal D flip/flop 934 (LS273). The processor then applies either a high or a low level signal, depending upon whether a particular gyro is or is not receiving its 400 hertz signal, to its address lines AD0–AD7. The signals are then passed through flip/flop 934 and are coupled to an output terminal grouping 936 on a connector 938. Each data line AD0-AD7 corresponds to a particular one of the gyros.

Sensors within the airplane monitor connections to the various gyros to determine whether or not the gyros are performing properly. This feature of the gyro system is simulated through the use of a relay bank 940. Contained within relay bank 940 are relays associated with each of the electrical parameters sensed by the airplane for each gyro. These are indicated as individual blocks within relay bank 940.

The executive processor has full control of the status of each of the relays within relay bank 940. This is accomplished by the processor applying a signal on its AD1-AD3 lines which, when decoded in decoder 924, will cause activation of its Y1 output. This signal is sensed, along with the presence of a WR* signal, by a gate 942 which then clocks an eight-bit register 944. At this point, the executive processor applies to its data lines AD0-AD7 an appropriate signal indicating the status of each relay group within relay bank 940. This signal is passed through register 944 and applied to each individual relay block. It will be recalled that the control unit (FIG. 2) provides a means to force an invalid condition, or test the RECO condition of any gyro. This is accomplished by the executive processor responding to a switch indicating the test of VALID/INVALID or RECO and controlling appropriate relays within relay bank 940.

Figure 9:
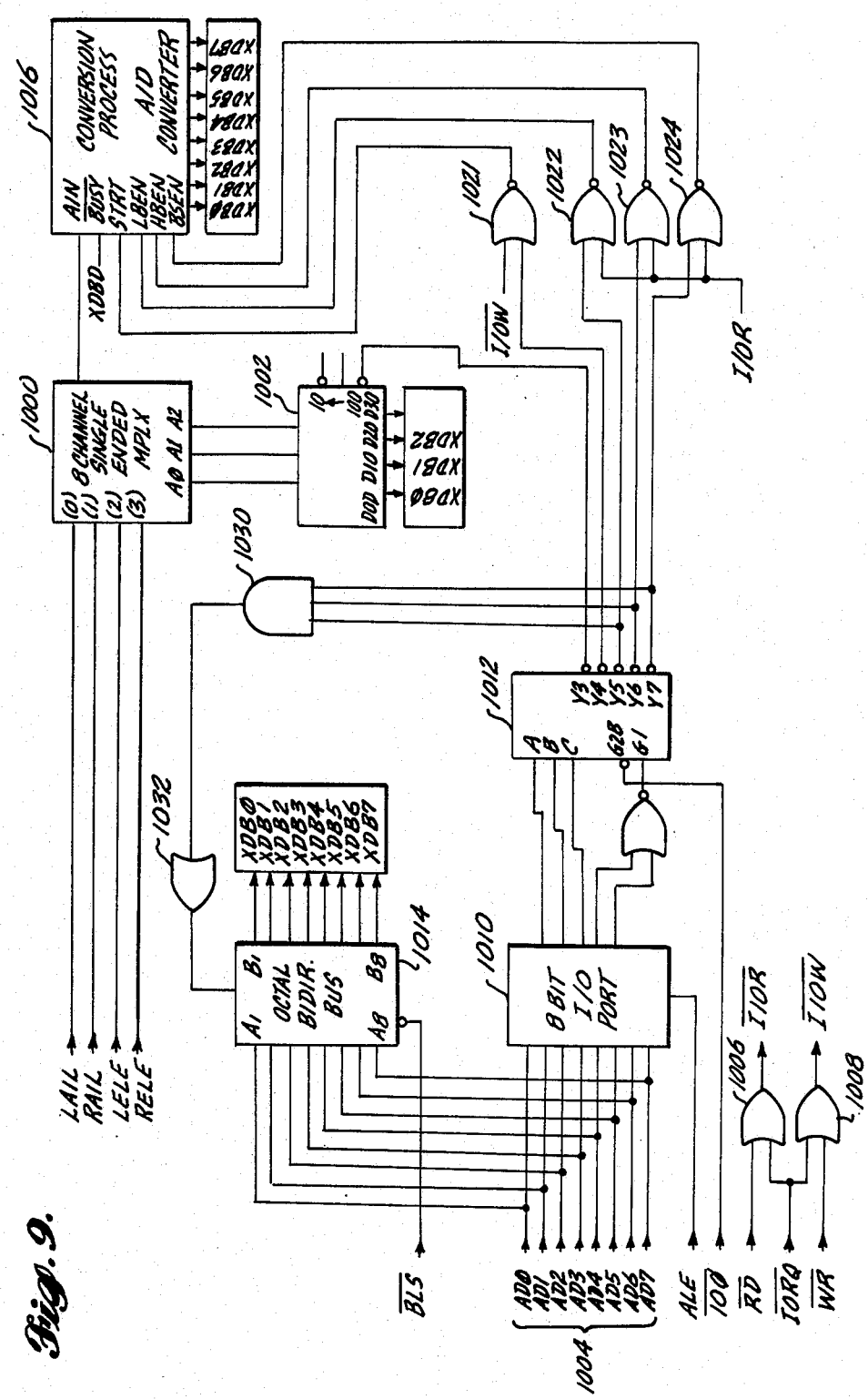
FIG. 9 is a detailed schematic diagrams of the electronics module data acquisition circuitry.

FIG. 9 is a detailed schematic diagram of the electronics module data acquisition circuit 250 of FIG. 3. The purpose of this circuit is to monitor the status of the aircraft control surfaces and produce a digital signal corresponding to this status.

Input to the circuit of FIG. 9 are signals corresponding to the left and right ailerons and the left and right elevators. These signals are normally generated by sensors positioned at the control surfaces. For purposes of the present discussion, it is assumed that these are DC signals. In applications wherein the control surface sensing signals are AC, conventional means may be employed to convert them to a corresponding DC signal.

The aircraft control surface sense signals are passed to the inputs of an eight-channel, single ended multiplexer 1000 (type DG508A). Multiplexer 1000 responds to address signals at its address inputs A0-A2 to output on its output line one of four input signals. The address signals to multiplexer 1000 are provided from the output of a quad D flip/flop 1002 (type 4076). Flip/flop 1002, and, thus, multiplexer 1000 are under the control of the executive processor (unit 270 of FIG. 3). The executive processor connects to the circuit of FIG. 9 via a seven-bit bus 1004, having address lines AD0-AD7. The processor also supplies a series of control lines including a bus low strobe BLS, an output latch enable ALE, a read RD, and a write WR, all of which provide the same commands as is described with respect to FIG. 7. In addition, the processor provides a signal IO0, which is activated when the processor is at the 0 designated portion of its memory, corresponding to operation of the circuit of FIG. 9. Further, a signal IORQ is provided, this signal indicating the position of an input or output request. As shown, gates 1006, 1008 oprate to convert the RD and IORQ signal into an input/output read signal I/OR and the WR signal and the IORQ signal into an input/output write command I/OW.

The executive processor addresses the circuit of FIG. 9 by an appropriate address on data lines AD1-AD3. This signal is passed through an eight-bit input/output port 1010 in response to a received ALE signal. Port 1010 transfers the AD1-AD3 signals to the A, B and C inputs of a three- to eight-line decoder/demultiplexer 1012 (LS138).

With the Y3 output of decoder 1012 activated, a signal is applied to flip/flop 1002 which, along with the IOW signal, allows flip/flop 1002 to latch out the address at its input. This input address is the first three lines from an internal data bus XDB0-XDB7. This internal data bus connects to an octal bidirectional bus 1014. The executive processor data lines AD0-AD7 connect to the other side of bus 1014. Thus, the executive processor, by coupling an appropriate three-bit address through bus 1014 and flip/flop 1002, causes the multiplexer 1000 to output a selected one of the four input control surface sensor signals. This signal is passed to the analog input terminal of an analog-to-digital converter 1016.

Converter 1016 operates in the conventional manner to convert an input analog signal to a corresponding digital signal. This digital signal is output from converter 1016 to the internal data bus lines XDB0-XDB7. Controls to the converter 1016 include a start STRT input, connected to the output of gate 1021, a low byte enable LBEN, connected to the output of gate 1022, a high byte enable HBEN, connected to the output of gate 1023 and a busy enable BSEN, connected to the output of gate 1024. Converter 1016 also has a busy signal which connects to the first internal data bus line XDB0.

In operation, the executive processor selects one of the aircraft analog surface sensor signals LAIL, RAIL, LELE and RELE by appropriate addressing through flip-flop 1002 and multiplexer 1000. This signal is passed to the A/D converter 1016, which is suitably activated to produce the corresponding digital signal. This digital signal is passed over the internal data bus to octal bidirectional bus 1014. This data is then output from bus 1014 to the executive processor for further processing. In this manner, each aircraft control surface signal is converted to a corresponding digital signal, and stored by the executive processor.

Figure 10A:
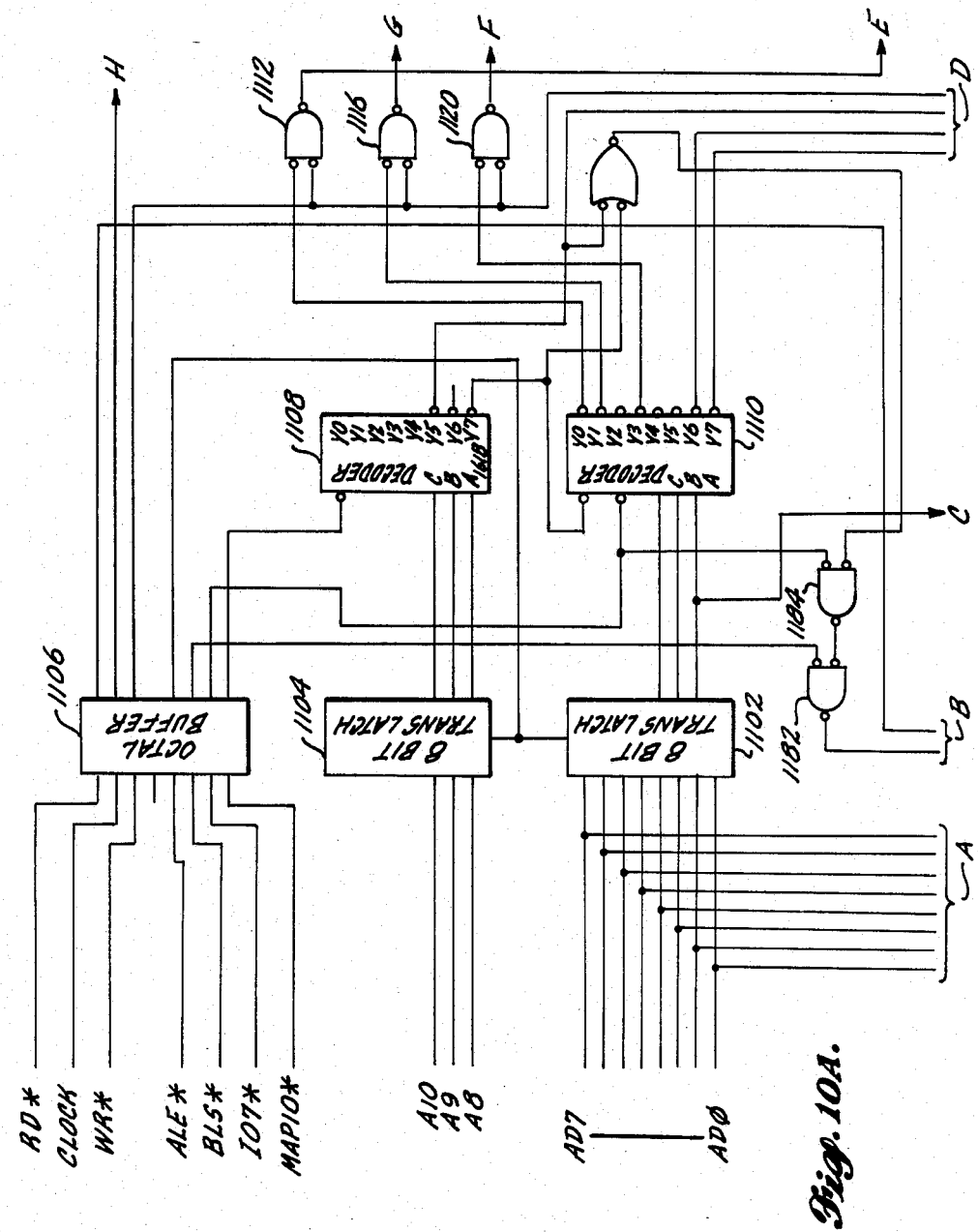
FIGS. 10A–10D are detailed schematic diagrams of the electronics module synchro control circuitry.
Figure 10B:
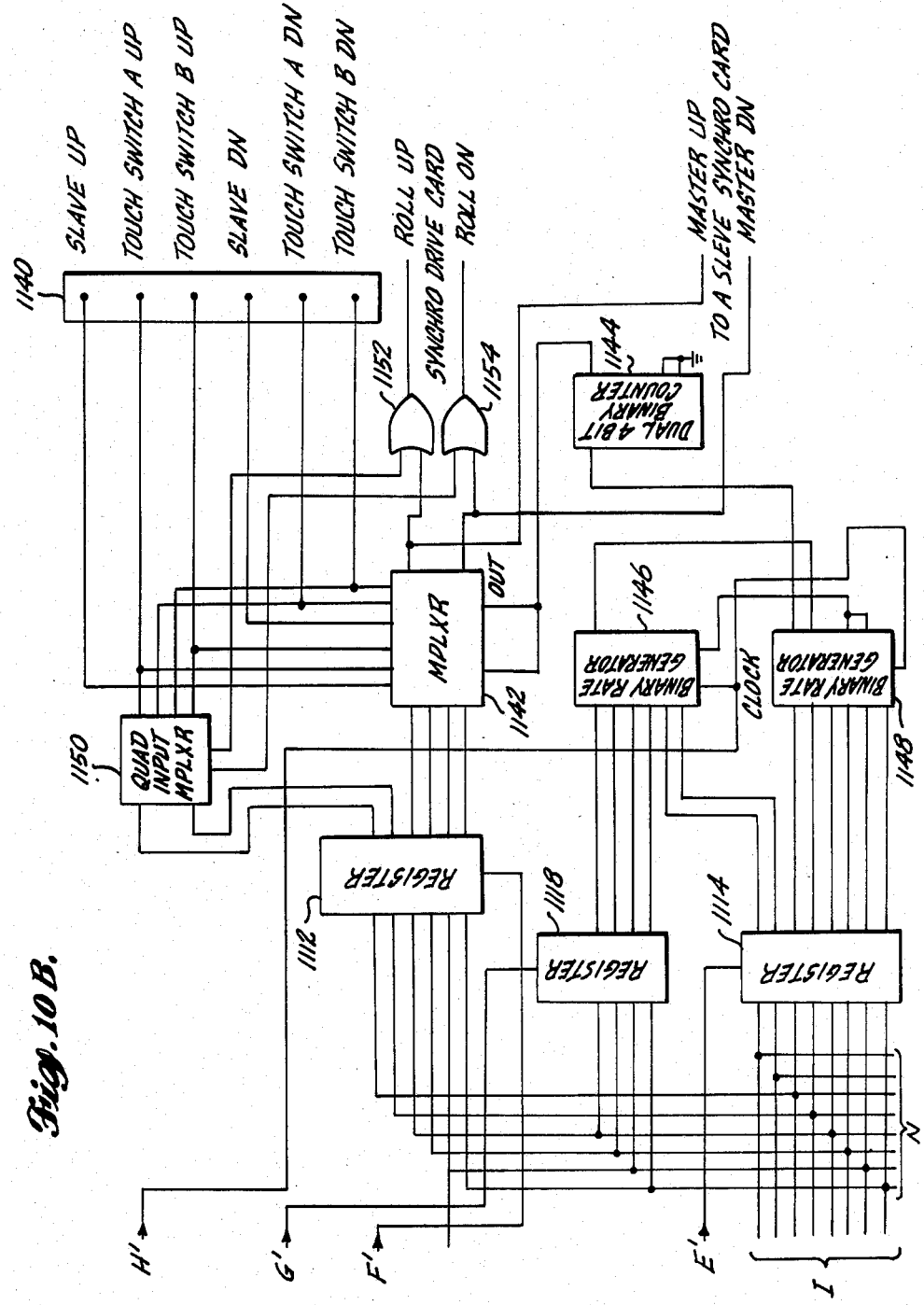
Figure 10C:
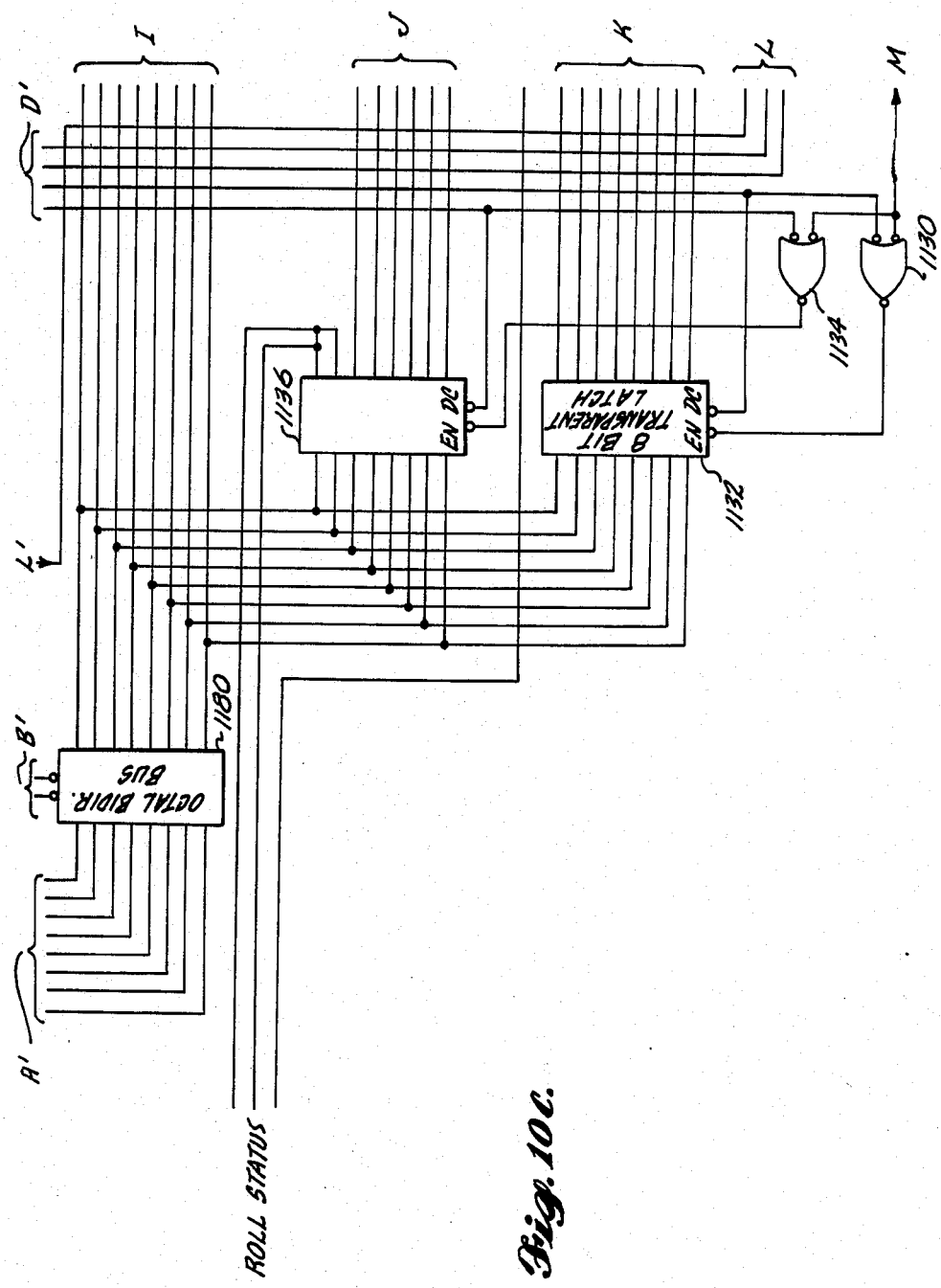
Figure 10D:
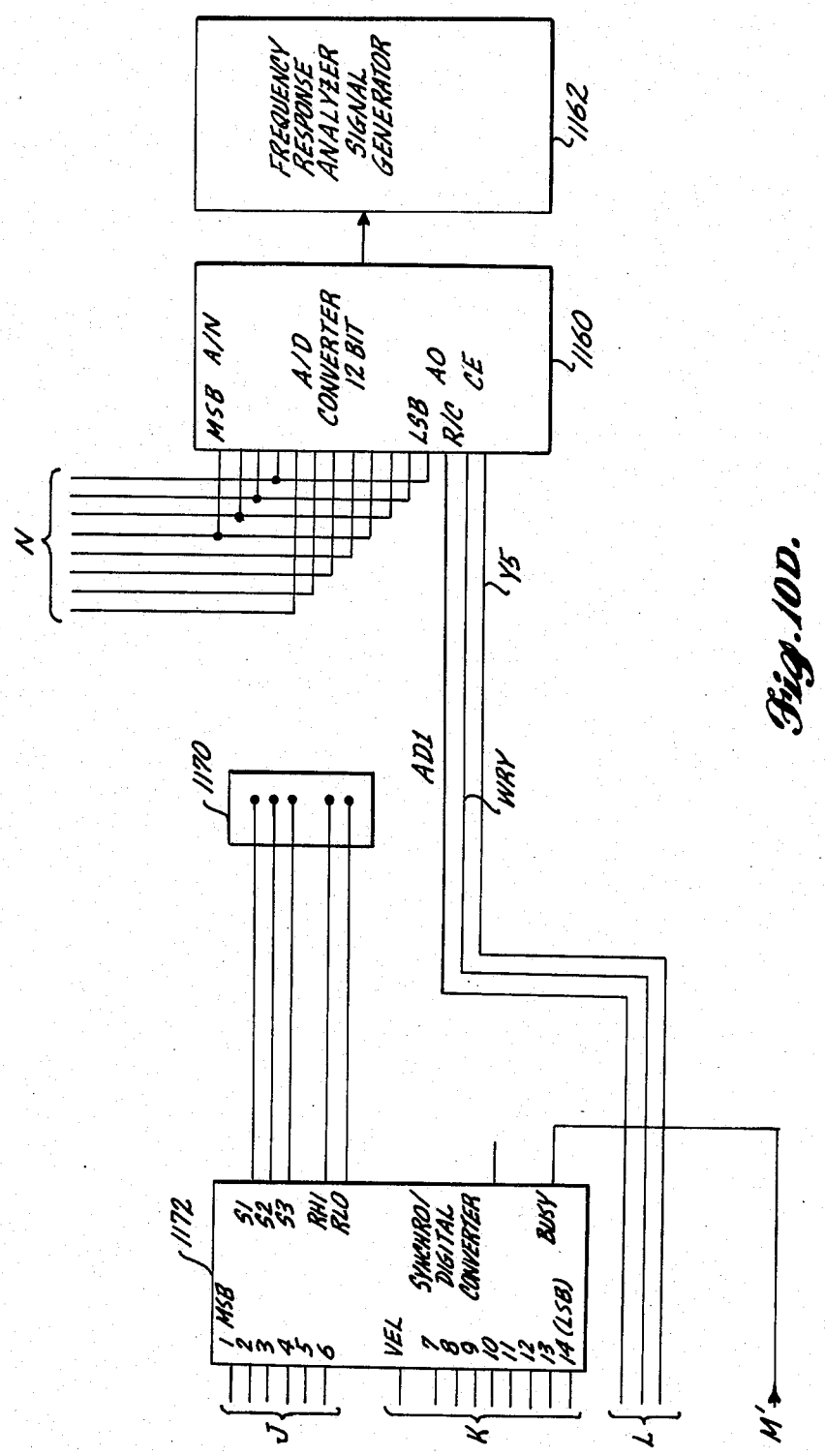
Figure 11:
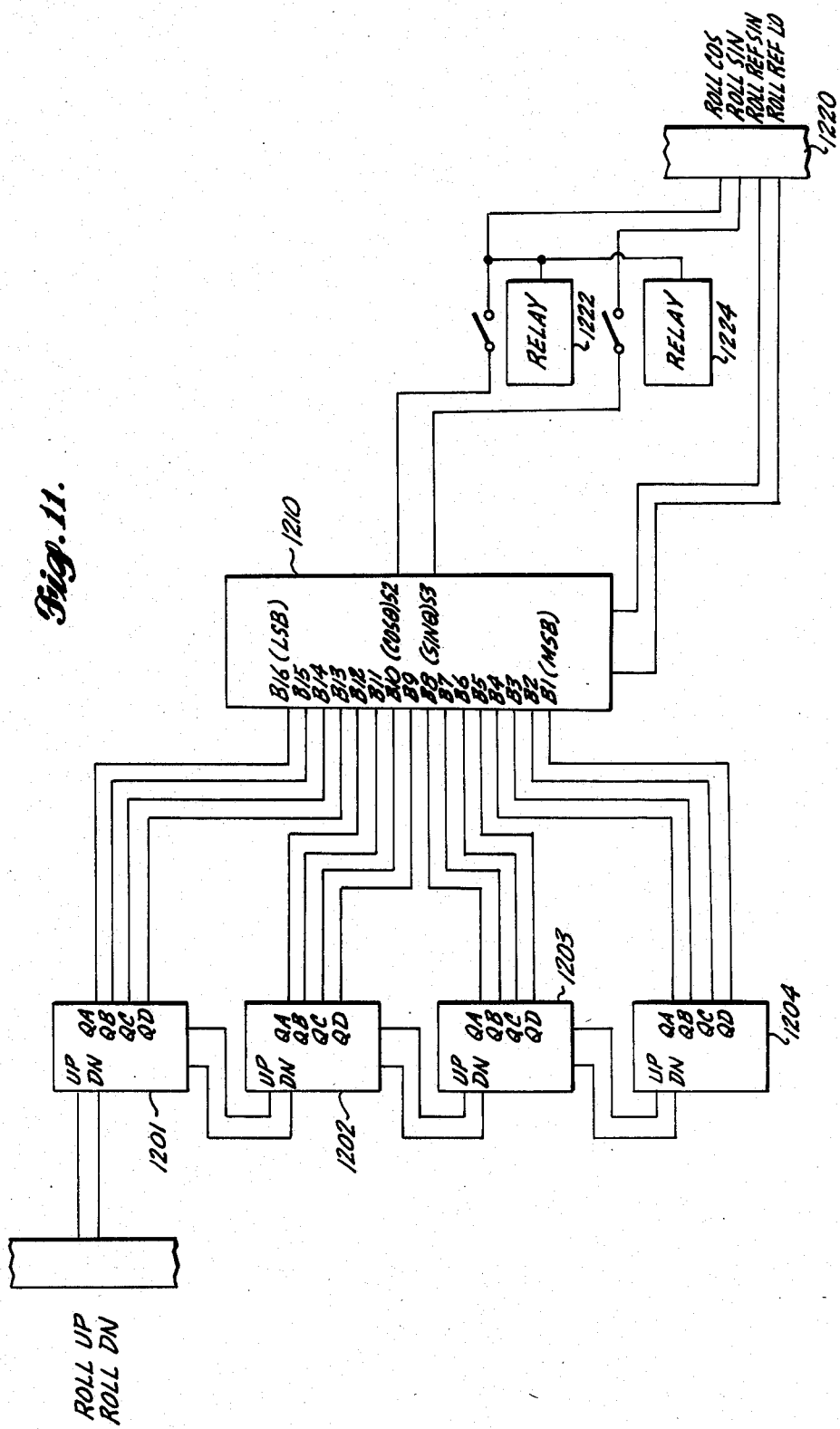
FIG. 11 is a detailed schematic diagram of the electronics module synchro drive circuitry.

FIGS. 10-10D are detailed schematic diagrams of a sychro control circuit, such as the roll synchro control circuit 308 of FIG. 3. The synchro control circuit operates in the manual mode to pass the touch and direction sensitive switching signals to the synchro drive circuit (FIG. 11). In the automatic mode, the synchro control circuit responds to signals produced by an associated logic circuit, such as logic 302 of FIG. 3, to generate corresponding synchro signals in digital form. In addition, the synchro control circuit may be used to modulate the generated synchro signals with a frequency response analyzer signal.

The processor associated with each synchro circuit includes an eight line data bus AD0-AD7, which is passed to a transparent latch 1102 (type LS373) and a three-bit address line A-A10 coupled to a transparent latch 1104 (also type LS373). In addition, the processor produces a series of command signals, including a read signal RD*, a clock signal, a write signal WR*, an address line enable ALE*, a bus low strobe BLS*, a signal IO7* indicating that the processor is in segment seven of its memory corresponding with the circuit of FIG. 10, and a MAPIO* signal, corresponding to input/output mapping. These signals, excluding the clock signal, perform in a manner similar to that described with respect to previous figures. The clock signal, in the preferred embodiment of the invention, runs at a frequency of 4 mHz. These various command signals are passed to an octal buffer 1106 (type LS244).

The processor addresses the circuit of FIG. 10 by applying a suitable address at its address lines A8–A10. This address is passed through latch 1104, under the control of buffer 1106, to a three-to-eight line decoder/demultiplexer 1108. If the address at the input to decoder 1108 causes the Y7 output thereof to be activated, this in turn enables the three-to-eight line decoder/demultiplexer 1110 (also type LS138). Decoder 1110 receives at its addressed inputs, the first three data lines AD0–AD2 of the data bus as passed through latch 1102 under the control of buffer 1106. If, for example, the address at the input to decoder 1110 causes its Y0 output to be activated, this in turn, along with a suitable WR* signal passed through buffer 1106 activates the output of a gate 1112. Gate 1112 then clocks a register 1114 (type LS374) which has its input lines connected to an internal data bus D0–D7.

If the Y1 output of decoder 1110 is activated, this, along with a suitable WR* signal from buffer 1106 activates gate 1116. With gate 1116 activated, a register 1118 (also type LS374) is clocked. Gate 1118 is connected at its input to the first four lines D0–D3 of the internal data bus.

An activated Y3 output from decoder 1110, along with a suitable WR* signal through buffer 1106 activates gate 1120. Gate 1120, in turn, clocks a register 1122 (also type LS374) which has its inputs connected to the first six data lines D0–D5 of the internal data bus.

An activated Y6 output from decoder 1110 is coupled both to a control input of a transparent latch 1132 (type LS373), and as an input to a logic gate 1130.

Finally, an activated Y7 output from decoder 1110 is passed both to a control input of an eight-bit transparent latch 1136 (LS373) and to an input of a logic gate 1134. The output from logic gate 1130 is coupled to the enable input of latch 1132, whereas the output from the gate 1134 couples to the enable input of latch 1136.

The touch and direction sensitive pulses, as processed through the interface circuitry of FIG. 7, are coupled to an input connector 1140. For the condition wherein another channel is to operate as a master, the corresponding slave up, or slave down signals are also coupled to the connector 1140.

These signals are coupled to the inputs of a dual four line/one line data selector/multiplexer 1142 (LS153). Also connected to the enable and binary control inputs of multiplexer 1142 are four output lines from register 1122.

The further input to multiplexer 1142 is an output line from a dual four-bit binary counter 1144. Binary counter 1144, in turn, is driven from a pair of binary rate generators 1146, 1148 (type LS97). The binary rate generators have as their input the outputs from registers 1114, 1118.

The touch and direction switch up and down signals coupled to input connector 1140, are also applied as an input to a multiplexer 1150 (type LS157). Multiplexer 1150 receives as control inputs the outputs from the register 1122. The output signals from the multiplexer 1150 are coupled to the inputs of gates 1152, 1154, which gates have as additional inputs the outputs from the multiplexer 1142. The outputs from gates 1152, 1154 constitute the roll-up, or roll-down, respectively signals from the synchro circuitry, which, in turn, are fed to the synchro drive circuitry of FIG. 11.

As discussed hereinabove with respect to FIG. 3, it is often desirable to test the frequency response of the aircraft circuitry, which receives the gyro signals. More specifically, it is often desirable as a diagnostic measure to modulate the gyro signals with a frequency test signal, such as a low frequency sine wave, to identify any resonant frequencies in the system. Such testing may be accomplished by generation of the test signal in frequency response analyzer signal generator 1162. This analog signal is applied at the analog input of an analog-to-digital converter 1160 (type AD574KD). The digital output signal produced by converter 1160 is connected to the internal data bus D0–D7 for the circuit of FIG. 10. Controls to the converter 1160 include a chip enable (CE input), which connects to the Y5 output from the multiplexer 1108, a read/convert input, coupled to the WR* signal, and a byte address/short code input A0 which couples to the AD1 data line from the processor. Thus, by suitable command on the converter control lines, the processor can cause the converter to convert the frequency response test signal to a corresponding digital signal which appears on the data bus D0–D7.

The three wire synchro signals produced by the simulator are fed to a connector 1170. Coupled to connector 1170 are the inputs of a synchro-to-digital converter 1172 (type SDC1704). Converter 1172, acting in the conventional manner, converts the three wire synchro analog signal into a corresponding digital signal. This digital signal is applied to the output lines 1–14 which connect to the inputs of latches 1132, 1136. In addition, converter 1172 produces an output on its busy line when it is in the process of making its conversion. This busy signal is applied to the remaining inputs of the gates 1130, 1134.

An octal bidirectional buffer 1180 (type LS245) as controlled by gates 1182, 1184, couples data between the data bus lines AD0–AD7 and the internal data bus lines D0–D7.

Operation of the circuit of FIG. 10 may be understood as follows. When the user is operating the system in the manual mode, the signals appearing at connector 1140 are routed through multiplexer 1142 and are coupled as the corresponding roll-up or down signals through gates 1152, 1154. The switching of multiplexer 1142 to accomplish this end is determined by processor addressing afforded by 1108, 1110, and the address applied at the input to multiplexer 1142 through register 1122.

In the dynamic mode, the processor associated with the synchro control circuit of FIG. 10 receives data corresponding to input commands, control surface status and true airspeed and, in accordance with stored equations of flight for the aircraft under test, generates an appropriate digital signal corresponding to the gyro signal to be simulated.

The signal produced by the processor is, thus, passed through bidirectional bus 1180 and entered as an eight-bit value into register 1114, via the Y0 output from decoder 1110 and gate 1112, and an additional four-bit value, via the Y1 output from decoder 1110 and gate 1116. This signal is then clocked through binary rate generators 1146, 1148 at the rate of the CLOCK signal and passed to binary counter 1144.

If the processor receives a command from the control unit to input a frequency response analyzer test signal, converter 1160 is enabled via the Y5 output from decoder 1108. The WR* command and the first data bus line AD1 are used to cause the converter 1160 to output on the internal data bus the 12-bit digit representation of the test signal. This is, in turn, passed through bidirectional bus 1180 to the memory of the processor. The processor responds to the frequency response analyzer test signal in such a way that the digitized simulated gyro signal is modulated by this test signal.

Finally, the processor may read the actual value of the simulated gyro signal by activating the Y7 output from decoder 1110. This allows the enabling of latches 1132, 1136 which route the digitized synchro signals from converter 1172 through bidirectional bus 1180 to the processor. In this way, the processor can compare its output gyro signal with that gyro signal actually produced by the synchro drive circuit to thereby detect any errors in simulation.

FIG. 11 is a detailed schematic diagram of a synchro driver circuit, such as roll synchro driver circuit 310 of FIG. 3. While FIG. 11 illustrates a schematic diagram of the roll synchro driver circuit, it should be understood that the other channels which produce a simulated gyro signal include a synchro driver circuit of similar design.

The roll up or roll down digital pulse stream from the synchro control circuit of FIG. 10 is input to either the up or the down input of a counter comprised of four cascaded synchronized up/down dual clock counters 1201–1204 (type LS193). The total count contained in the counters 1201–1024 is, therefore, representative of the instantaneous value of the roll signal.

It will be noted that the count in counters 1201–1204 will increment for roll up signals and decrement for roll down signals.

The Q outputs from counters 1201–1204 comprise a 16-bit signal which is fed to the input of a digital-to-synchro converter 1210 (HDSR2006). Converter 1210 operates in the normal manner to convert the 16-bit digital input signal to a corresponding two-wire synchro analog signal representing COS $\theta$ and SIN $\theta$. In addition, LO and HI reference outputs are provided.

The COS $\theta$ and SIN $\theta$ signals are fed to an output connector 1220 via relays 1222, 1224, respectively. The relays 1222 and 1224 are activated by the vertical gyro status signal "VG STAT" provided by the relay circuit of FIG. 8. Thus, relays 1222 and 1224 close their corresponding switches only if the corresponding vertical gyro is receiving its appropriate 400 hertz power signal from the airplane.

The LO and HI signals are also passed to the output connector 1220.

It is seen, therefore, that the signals appearing at the output connector 1220 are in fact the simulated roll gyro signals. Pitch and azimuth signals are similarly simulated using corresponding synchro drive circuitry.

The pitch and roll signals may then be combined within a SCOTT T transformer (not shown) to produce the appropriate three-wire synchro signal suitable for application to the aircraft's vertical gyro input terminals. Similarly, the produced azimuth signal may be applied to the aircraft directional gyro input terminals.

Figure 12:
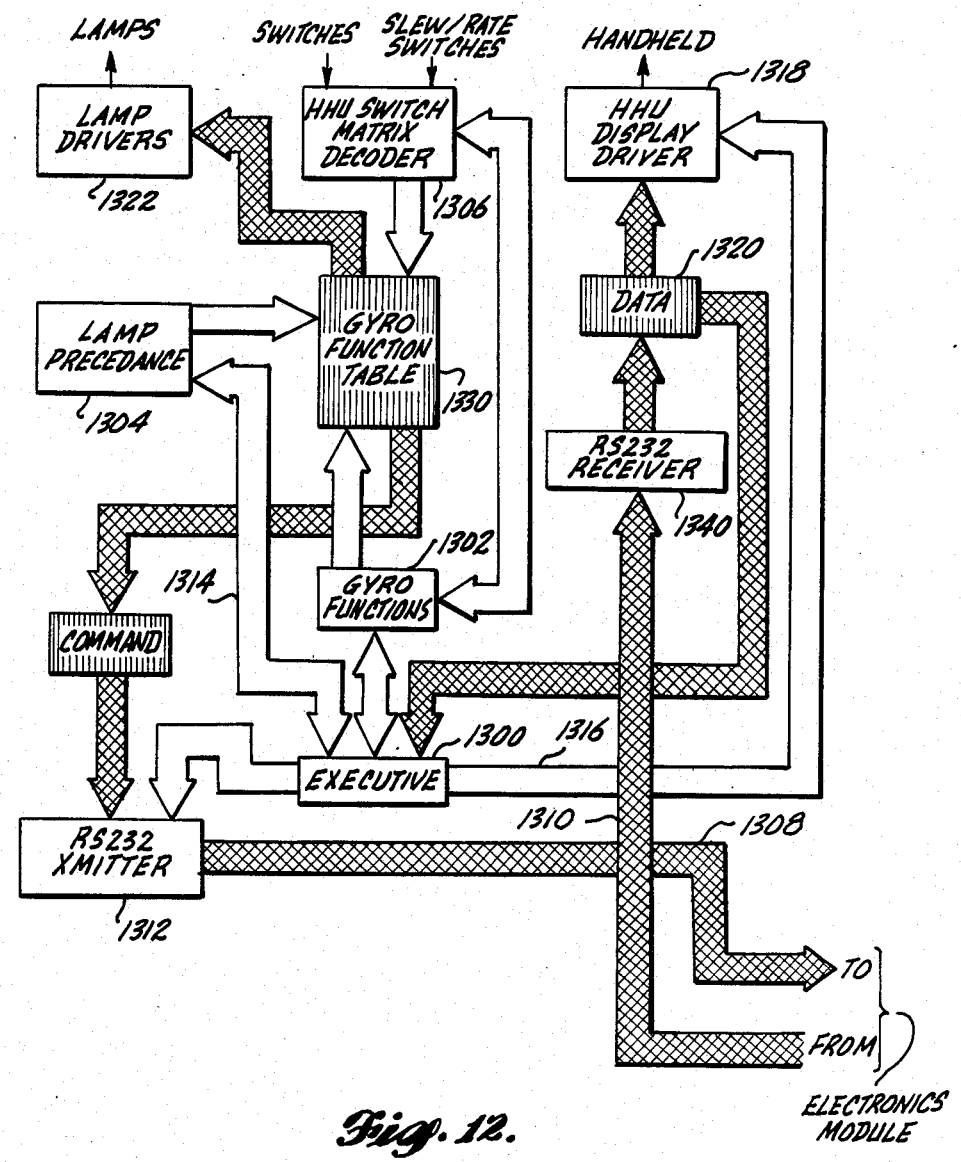
FIG. 12 is a data and control flow diagram for the hand-held unit and control unit; and, FIGS. 13 and 14 are data and control flow diagrams for the electronics module.
Figure 13:
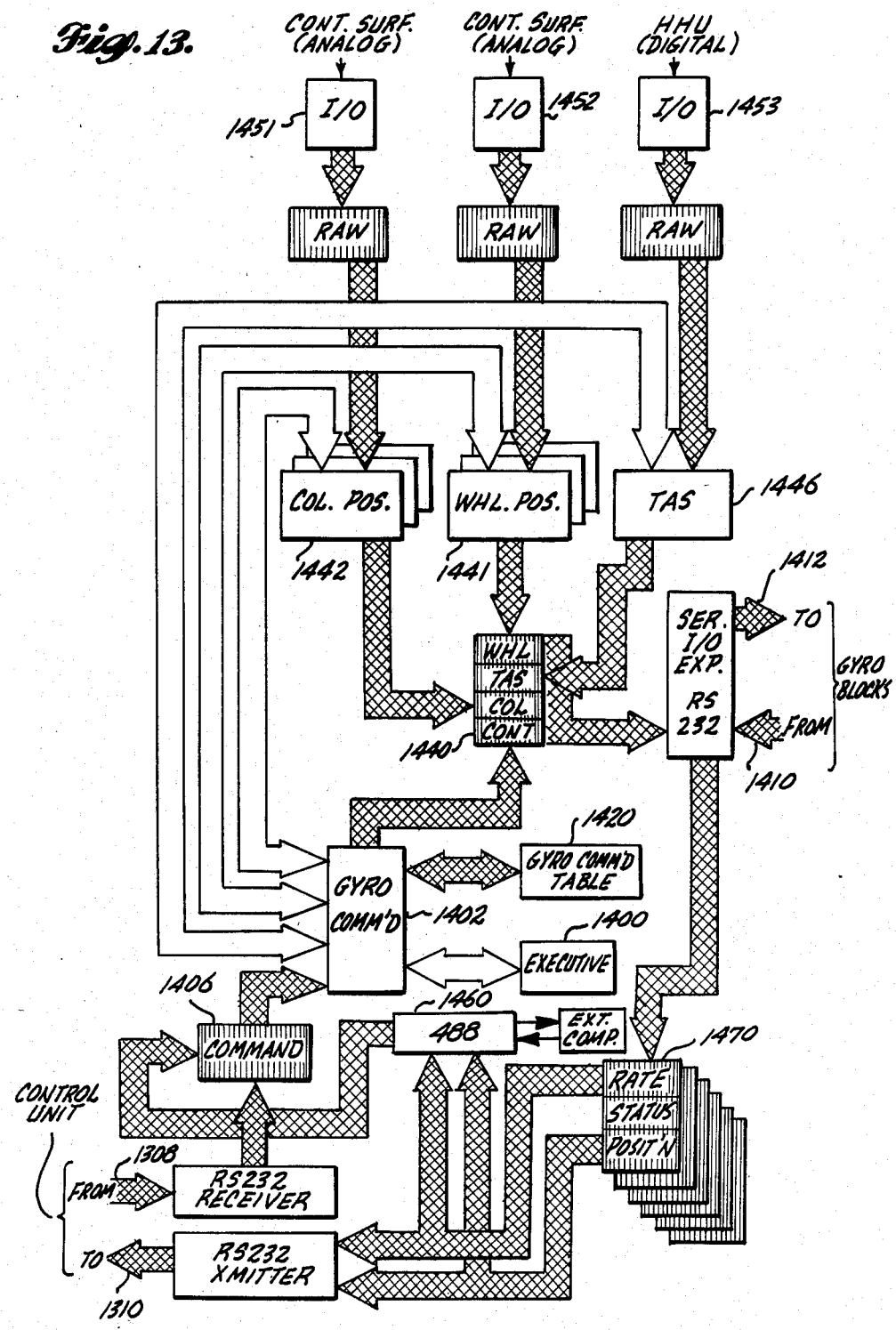
Figure 14:
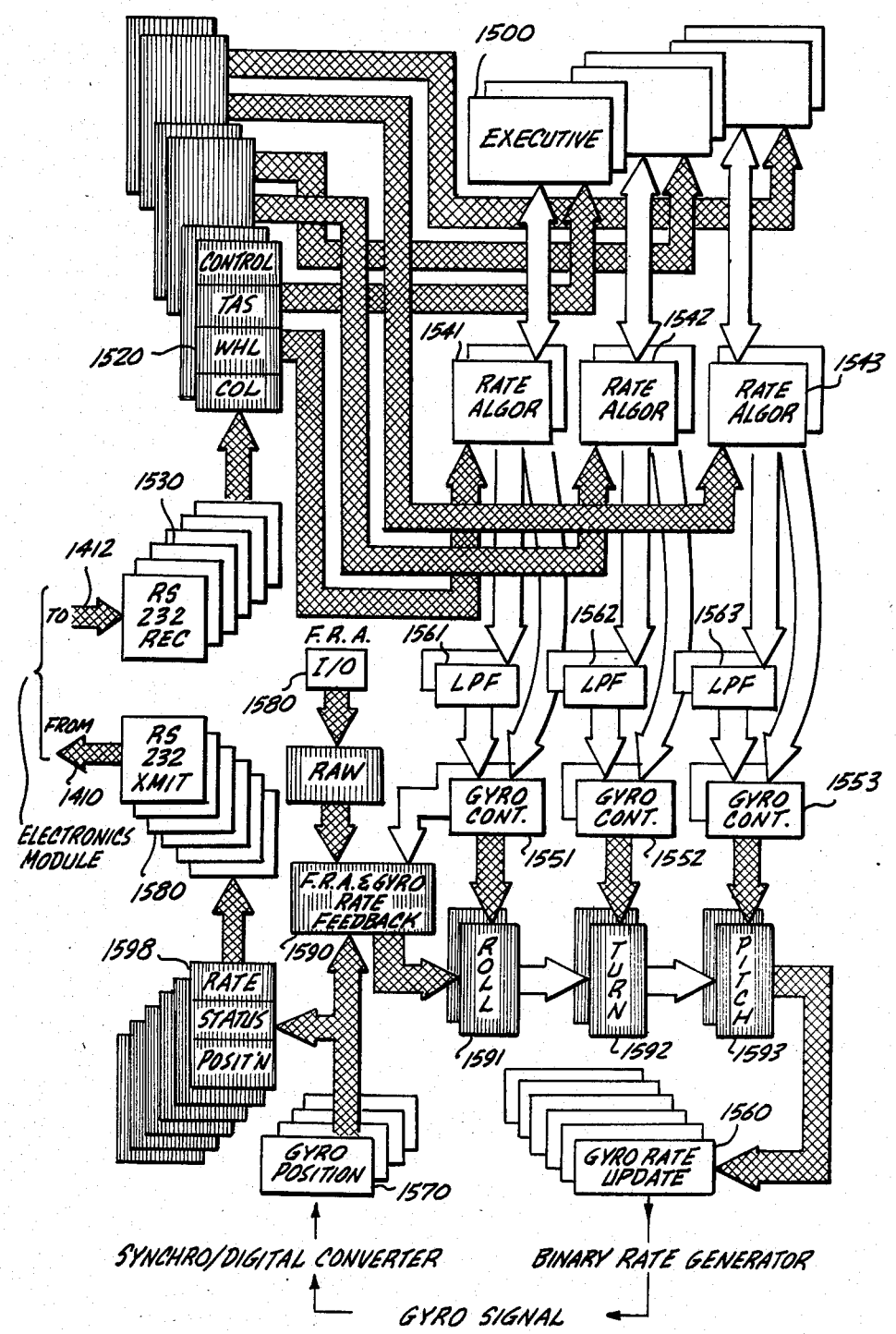

FIGS. 12, 13 and 14 are control and data flow diagrams for the gyro simulator. As such, these diagrams, along with the discussion given hereinabove, defines the software requirements for the system. Given the discussion above, in association with the discussion with respect to FIGS. 12–14, one of ordinary skill in this art could easily provide the specific software required in a given application.

For each of FIGS. 12–14, a cross-hatched line represents data flow whereas an open line represents control flow. A block with a plurality of vertical lines represents data.

FIG. 12 illustrates data and control flow for the control unit and hand-held unit. An executive module 1300 has the following requirements:

(1) Determine when a switch in the control unit is actuated and initiate the gyro function block 1302 and the lamp precendence module 1304 in response thereto;

(2) Determine the status of the switches in the hand-held unit from the hand-held unit switch matrix decoder 1306 and initiate a command to the electronics module over line 1308 in response thereto;

(3) Initiate a command transmission to the electronics module over line 1308; and, (4) Decode commands from the electronics module over a line 1310.

The inputs to the executive unit 1300 include the following information from the electronics module:

(1) Rate and position information for the A and B attitute position indicators;

(2) A gyro command byte; and, (3) A status code.

Additional inputs to the executive module 1300 include a switch matrix index and the status of the hand-held unit switches.

Outputs from executive module 1300 include:

(1) A gyro command to the electronics module over line 1308, as passed through an RS232 transmitter 1312;

(2) Lamp ON/OFF bytes, passed to lamp precedence module 1304 over a line 1314; and, (3) Attitude position indicator A position information, attitude position indicator B position information and rate information over a line 1316 for application to the hand-held unit display driver 1318.

A data module 1320 contains the following data blocks:

(1) Switch matrix index, (2) The hand-held unit switch index;

(3) The electronics module status word;

(4) A data received flag; and, (5) A command ready flag.

In operation, if the switch matrix index flag is set, the executive module 1300 executes the gyro function module and the lamp precedence module.

If the data received flag is set, update positions and the rate buffer for the hand-held unit display module.

If the command ready flag is set, execute the RS-232 transmit module.

If the electronics module status word is received, execute the lamp precedence module.

The gyro functions block 1302 determines the gyro function commands for use by the electronics unit. It inputs the lamp matrix index and current lamp status and outputs the command code. For data, it relies on the gyro function table 1330 and the current lamp status.

The requirements for the lamp precedence module 1304 are as follows:

(1) Turn off appropriate control unit lamps (as driven from lamp drivers 1322) and, (2) Examine the electronics module unit status.

The inputs to the lamp precedence module 1304 include the switch matrix index and lamp status bytes as provided by executive module 1300.

The data for the lamp precedence module 1304 is comprised of a gyro function table 1330 and the current lamp status. Gyro function table 1330 defines the relationship between each control command and the corresponding gyro related function.

The requirements of the lamp precedence module 1304 are met by the following processes:

(1) From switch matrix index registers and the current lamp status generate data words for the lamp drivers 1322 to turn OFF/ON the appropriate control unit lamps.

(2) Interpret the status word from the electronics module and, based on current lamp conditions, turn OFF/ON appropriate lamps.

The lamp drivers 1322 operate to convert ON/OFF data words, provided by the lamp precedence module 1304, to appropriate byte patterns required to drive the control unit lamps.

The hand-held unit switch matrix decoder 1306 determines the index into the lamp precedence table by the switch matrix decode number and the hand-held unit switch decode (each index determining a separate index into the table.) This module is called by the hand-held unit display driver 1318. Its function is to poll the hand-held unit switches to detect a change and take appropriate action.

Data to the hand-held unit switch matrix decoder 1306 is provided by a hand-held unit index, which is a code received as a result of polling the hand-held unit switches, and a status code indicating the current hand-held unit switch status.

In operation, the hand-unit switch matrix decoder 1306 switch port is read at the same rate as the hand-held unit display. If a change is detected in the switch setting, then an indicator flag is set and the hand-held unit switch status is updated.

The hand-held unit display driver 1318 has the following requirements:

(1) Display the measured position on attitude position indicator A, (2) Display measured position on attitude position indicator B, and, (3) Display measured rate in rate display.

The data input to hand-held unit display driver 1318 is a position A signal, a position B signal, a rate A signal, a rate B signal, and a hand-held unit switch setting.

Interrupts to the executive 1300 are provided for receiving the switch matrix codes when a switch on the front panel is depressed. The data for the interrupt consists of a switch matrix index. An interrupt is received when a switch matrix key is depressed. The switch matrix key interrupt routine acknowledges the interrupt and reads in the depressed key code. The value is then stored as the switch matrix index and a status byte is set to indicate data received.

The RS-232 requirements of executive 1300, related to transmitter 1312 and receiver 1340, require a synchronous, interrupt driven input-output of data bytes of specified length starting at specified memory locations. Also, there must be verification of valid (check sum) and the maintenance of status (flags) indicating ready, busy and valid data, and the necessary RS-232 hand shaking signals.

The input/output requirements are of data and status ports. The data output is the gyro function command and the input data is the measured rate, measured position and electronics module status word.

In operation, an interrupt receive routine begins when the start of a new data transmission is detected. A byte counter, buffer counter, check sum and flag are initialized. Each data byte received is stored at a pointer and a pointer counter and check sum are adjusted until the counter indicates that all data has been received. Check sum is complimented and the flag is set to indicate valid/invalid data. The interrupt transmit routine is initiated by a call to the routine which resets the buffer pointer, byte counter, check sum and flag. The transmission of a data byte causes an interrupt for the next byte until the counter indicates completion. The flag is set to "not busy" at completion.

FIG. 13 illustrates control and data flow for the executive control associated with the electronics module. The basic functions performed by the executive 1400 are:

(1) To process gyro commands received from the control unit over line 1308;

(2) To convert raw data representing true air speed to a floating point format and to provide these converted values to the various control loops;

(3) To convert raw data defined column and wheel position into floating point format and provide these values to the control loops; and, (4) To convert angular position and rate data into the appropriate format for display and output this data to the control unit over the line 1310.

The specific requirements for the executive module 1400 are that it shall:

(1) Determine when a new command has been received, (2) Execute the gyro command 1402 module, (3) Determine when control loop data is available, (4) Monitor the status of the control loops and the electronics module, and, (5) Initiate transmission of data and status to the control unit (FIG. 12) over line 1310 or to an external computer 1404.

The data to the executive module 1400 includes command data from command module 1406, control unit input data status and output data status, over lines 1308, 1310, control loop input status, provided over a line 1410 and the appropriate flag and status signals.

In operation, when the flag indicates a received command data which is valid, the command word is moved to the gyro command module 1402 for execution. When the flag indicates the control loop status data available, this data is moved to the RS-232 transmit buffer 1412 and transmission is initiated. Internal status, as reported by electronics module, is also monitored and reported in the output status data.

The gyro command processing module 1402 processes the gyro commands received from the control unit and/or an external computer 1404. For each command received, the command processing module performs the operation(s) specified by the command and, in addition, if the command was received from an external computer 1404 it transfers a "status information signal" identifying the operation that was performed to the control unit.

Each command received from the control unit is processed and executed immediately upon being received.

The gyro command module, upon the receipt of a command from the control unit or an external computer 1404 recognizes and implements each gyro command as:

(1) A set of predetermined responses and,
(2) Modifies each response as necessary to avoid conflict.

The gyro command module 1402 operates to
(1) Search the gyro command table until a match is found and then
(2) Exercise the logic between each desired table entry and the gyro simulator current status registers to determine commands to all control loops, the appropriate analog algorithms to implement, the hand-held unit display data and the current gyro simulator status.

An analog algorithms module 1440 converts raw analog and digital input data into corresponding column position, wheel position and true air speed signals.

Input data to the analog algorithm 1440 includes the gyro command table 1420, binary column position data, from module 1442, binary wheel position data, from module 1444, and true air speed data from module 1446. The analog algorithms module 1440, when executed by the gyro command module 1402, retrieves analog input/output raw data corresponding to column position and wheel position, and digital data, corresponding to true are speed. Then, by means of the gyro command table 1420 algorithm words, executes the appropriate aircraft algorithm connecting raw data into floating point data. This data is then placed into an output buffer and an indicator flag is set to reflect that data is ready for transmission.

A pair of input-output modules 1451, 1452 convert aircraft analog signals, such as representative of the position of an elevator or an aileron, to a corresponding digital word. In addition, an input/output module 1453 converts the hand-held unit touch sensitive switch data to a suitable digital word. These digital words are then selectively accessed by corresponding column and wheel position modules 1442, 1444 and the true air speed module 1446.

A RS-232 input/output port 1412 is capable of handling asynchronous, interrupt driven input/output data bytes of specific length, starting at specified memory locations. This port is also capable of verification of valid data (check sum) and the maintenance status (flags) indicating ready, busy and valid data. Port 1412 also handles the necessary RS-232 handshake signals. Its operation is similar to that described with respect to transmitter 1312 and receiver 1340 of FIG. 12.

A 488 input/output module 1460 receives and transmits standard ASCII characters. It receives as inputs electronics module selection or command words. The corresponding output is angle, rate and status information.

A series of data registers 1470 store rate, status and position information for output over the RS-232 line 1310, via RS-232 transmitter 1480, or the 488 line, via module 1460. Received data on line 1308 is passed through RS-232 receiver 1482.

FIG. 14 illustrates control and data flow for the control loop portion of the electronics module. The requirements of executive 1500 are that it:
(1) Determine when new input data is available;
(2) Move the input data to a working register;
(3) Implement the desired gyro rate functions as indicated in the control word;
(4) Determine when output data and status are available; and,
(5) Move output data and status to the transmit routine.

Input to the executive module 1500 are a current wheel position, column position and true air speed as provided out of registers 1520, which receive this information via line 1412 and RS-232 receivers 1530.

The executive 1500 determines which of the three rate algorithms 1541-1543 are to be executed in response to a control word.

A series of three gyro rate control modules 1551-1553 convert and schedule the latest rate data via the rate algorithms 1541-1543 for use by a gyro rate update module 1560. The gyro rate control modules 1551-1553 use as data input the calculated rate, next rate, active rate, next direction and active direction data.

A gyro rate update module 1560 provides a direction and rate update to one of the roll, turn or pitch gyros. This updated frequency is equal to or less than one complete execution of a rate algorithm. Direction and rate data is provided by the gyro rate control modules 1551-1553.

The rate algorithms 1541-1543 execute the applicable mathematical expression as determined by the gyro algorithm controls 1551-1553 to thereby produce the desired roll rate, pitch rate or azimuth rate.

A series of low pass filters 1561-1563 filter, or smooth the calculated rate prior to application of this signal to the gyro rate control modules 1551-1552. This is a mathematical expression "smoothing" to the calculated rate from the gyro algorithm.

A gyro position module 1570 determines the gyro position and accurately calculates the actual gyro rate by reading the synchro/digital converters receiving gyro input data. The RS-232 receiver 1530, and its corresponding transmitter 1580 operate in a manner similar to those described with respect to FIGS. 12 and 13.

A frequency response analysis (FRA) module 1580 provides a step input into the gyro control to directly affect roll, pitch and azimuth rates.

The FRA signal is passed to the rate feedback module 1590. Rate feedback module 1590 responds to a flag indicating valid data for the FRA module 1580 to sum this rate feedback value with the current next rate to produce a step rate value in roll, azimuth and pitch registers 1591-1593, respectively.

Rate, status and position registers 1598 store the gyro position data for transmission over the RS-232 transmitter 1580.

In summary, an improved gyro simulation system has been described. The system is capable of dynamically testing gyro responsive systems as well as testing redundant autopilots.

While a preferred embodiment of the invention has been described in detail, it should be apparent that many modifications and variations thereto are possible, all of which fall within the true spirit and scope of the invention.

The embodiments of the invention in which an exclusive property or privilege is claimed are defined as follows:

1. For use in testing an aircraft having control surfaces deployable in response to manual control column and automatic flight control system commands, a gyro simulator for simulating the pitch, roll and azimuth signals normally produced by the aircraft's onboard gyro system, the simulator comprising:

command input means selectively operable in a manual or a dynamic mode;

said command input means operable in the manual mode to produce command signals corresponding to a manually controlled change of a selected one of the simulated pitch, roll and azimuth signals;

said command input means operable in the dynamic mode to permit controlled changes in the simulated pitch, roll and azimuth signals as a function of aircraft control column and flight control system commands;

command responsive means including input means for inputting:
(a) signals representative of the status of the aircraft's control surfaces,
(b) a command airspeed value; and
(c) the command input means produced command signals;

memory means for storing the equations of flight of the aircraft under test, and logic means responsive to said input means and said memory means for producing said simulated pitch, roll and azimuth signals.

2. The simulator of claim 1 for use in testing an aircraft having a flight control system capable of receiving and processing signals from first and second gyro channels:

wherein the command input means includes means for producing first command signals for commanding a change in one of the simulated pitch, roll and azimuth signals of a first gyro channel and means for producing second command signals for commanding a change in one of the simulated pitch, roll and azimuth signals of a second gyro channel; and wherein the command responsive means includes:
first logic means responsive to said input means, memory means and command input means produced first command signals for producing the first gyro channel simulated pitch, roll and azimuth signals; and
second logic means responsive to said input means, memory means and command input means produced second command signals for producing the second gyro channel simulated pitch, roll and azimuth signals.

3. The simulator of claim 2 wherein the command input means includes means to command a MASTER/SLAVE relationship between the first and second gyro channels and wherein the command responsive means includes means responsive to a MASTER/SLAVE command to cause the simulated gyro signals in the SLAVE designated channel to track the simulated gyro signals in the MASTER designated channel.

4. The simulator of claim 3 wherein the command input means includes means operable in the manual mode to manually control a selected one of the simulated gyro signals in the designated SLAVE channel to thereby offset said selected gyro signal from its corresponding MASTER designated value.

5. The simulator of any one of claims 1 through 4 further comprising:
indicating means for indicating the instantaneous value of a selected one of the simulated pitch, roll and azimuth signals, said indicating means further indicating the rate of change of said selected one of the simulated pitch, roll and azimuth signals.

6. The simulator of claim 5 wherein the command responsive means is operable in a remote mode to input computer produced command signals and produce said simulated pitch, roll and azimuth signals in response thereto.

7. The simulator of any one of claims 1 through 4 wherein the command responsive means is operable in a remote mode to input computer produced command signals and produce said simulated pitch, roll and azimuth signals in response thereto.

8. The simulator of any one of claims 1 through 4 wherein the command responsive means further comprises:
means adapted to receive a test signal suitable for use in analyzing the frequency response of aircraft systems receiving simulated gyro signals; and,
means for modulating a selected one of said gyro signals with the test signal.

9. The simulator of any one of claims 1 through 4 wherein the command input means further comprises means associated with each simulated gyro signal for producing a zero command signal and wherein the command responsive means responds to a produced zero command signal to increment the associated simulated gyro signal to a zero value.

10. The simulator of claim 9 wherein the command input means further comprises means associated with each simulated pitch and azimuth signal for producing a fault test command signal, and wherein the command responsive means responds to a produced fault test command signal to produce a predetermined fault test signal in place of the associated simulated pitch or azimuth signal.

11. The simulator of claim 10 wherein the command input means further comprises means associated with each simulated roll signal for producing a roll erection cutoff test command signal, and wherein the command responsive means responds to a produced roll erection cutoff command signal to produce a predetermined test signal in place of the associated simulated roll signal.

12. The simulator of claim 9 wherein the command input means further comprises means associated with each simulated roll signal for producing a roll erection cutoff test command signal, and wherein the command responsive means responds to a produced roll erection cutoff command signal to produce a predetermined test signal in place of the associated simulated roll signal.

13. The simulator of any one of claims 1 through 4 wherein the command input means further comprises means associated with each simulated pitch and azimuth signal for producing a fault test command signal, and wherein the command responsive means responds to a produced fault test command signal to produce a predetermined fault test signal in place of the associated simulated pitch or azimuth signal.

14. The simulator of claim 13 wherein the command input means further comprises means associated with each simulated roll signal for producing a roll erection cutoff test command signal, and wherein the command responsive means responds to a produced roll erection cutoff command signal to produce a predetermined test signal in place of the associated simulated roll signal.

15. The simulator of any one of claims 1 through 4 wherein the command input means further comprises means associated with each simulated roll signal for producing a roll erection cutoff test command signal, and wherein the command responsive means responds to a produced roll erection cutoff command signal to produce a predetermined test signal in place of the associated simulated roll signal.

16. The simulator of any one of claims 1 through 4 wherein the command responsive means further comprises:
   lag filter means for predeterminedly time delaying the production of the simulated gyro signals to thereby simulate time lags normally associated with the response of the aircraft.

17. The simulator of any one of claims 1 through 4 wherein the command input means further includes means for producing a manually controlled airspeed command signal, and wherein the command responsive means input means inputs said airspeed command signal as the commanded airspeed value.

18. The simulator of any one of claims 1 through 4 further comprising:
   a hand-held unit having a pair of touch and direction sensitive pulse generators mounted thereto, the hand-held unit further including first and second readouts for displaying the instantaneous values of selected first and second produced gyro simulated signals, and a third readout for displaying the rate of change of a selected one of the selected first and second produced gyro signals;
   said command input means further comprising means operable in the manual mode to process inputs from said pair of touch and direction sensitive pulse generators to thereby produce said command signals; and
   wherein said command responsive means includes means for monitoring the produced simulated gyro signals and producing signals suitable for driving said first, second and third readouts.

19. The simulator of claim 18 wherein the command input means further includes means for producing an airspeed command signal in response to at least one of said pair of touch and direction sensitive pulse generators and wherein the command responsive means includes means to input said airspeed command signal as said commanded airspeed value.

20. The simulator of any one of claims 2 through 4 further comprising:
   synchro combiner means for predeterminedly combining the simulated pitch and roll signals of the first gyro channel to thereby produce a simulated first channel vertical gyro signal, the synchro combiner means predeterminedly combining the simulated pitch and roll signals of the second gyro channel to thereby produce a simulated second channel vertical gyro signal.

21. The simulator of claim 1 further comprising:
   synchro combiner means for predeterminedly combining the simulated pitch and roll signals to thereby produce a simulated vertical gyro signal.

* * * * *